United States Patent [19]

Molaire et al.

[11] Patent Number: 5,766,810
[45] Date of Patent: Jun. 16, 1998

[54] METHODS FOR PREPARING COCRYSTALS OF TITANYL FLUOROPHTHALOCYANNES AND UNSUBSTITUTED TITANYL PHTHALOCYANINE, ELECTROPHOTOGRAPHIC ELEMENTS, AND TITANYL PHTHALOCYANINE COMPOSITIONS

[75] Inventors: Michel F. Molaire; Jeanne E. Kaeding, both of Rochester, N.Y.

[73] Assignee: Eastman Kodak Company, Rochester, N.Y.

[21] Appl. No.: 734,799

[22] Filed: Oct. 23, 1996

Related U.S. Application Data

[63] Continuation-in-part of Ser. No. 434,148, May 2, 1995, Pat. No. 5,614,342.

[51] Int. Cl.$^6$ ........................................ G03G 5/06
[52] U.S. Cl. ........................ 430/78; 430/135; 430/133
[58] Field of Search ............... 430/78, 135, 133; 540/141; 252/501.1; 106/411, 412

[56] References Cited

U.S. PATENT DOCUMENTS

| | | | |
|---|---|---|---|
| 3,296,008 | 1/1967 | Pugin et al. | 106/62 |
| 4,141,904 | 2/1979 | Cabut et al. | 260/314.5 |
| 4,701,396 | 10/1987 | Hung et al. | 430/58 |
| 4,882,427 | 11/1989 | Enokida et al. | 540/141 |
| 4,994,566 | 2/1991 | Mimura et al. | 540/141 |
| 5,007,173 | 4/1991 | Mimura et al. | 430/78 |
| 5,039,586 | 8/1991 | Itami et al. | 430/78 |
| 5,055,368 | 10/1991 | Nguyen et al. | 430/78 |
| 5,059,355 | 10/1991 | Ono et al. | 252/584 |
| 5,112,711 | 5/1992 | Nguyen et al. | 430/58 |
| 5,132,197 | 7/1992 | Iuchi et al. | 430/76 |
| 5,166,339 | 11/1992 | Duff et al. | 540/141 |
| 5,194,354 | 3/1993 | Takai et al. | 430/58 |
| 5,206,359 | 4/1993 | Mayo et al. | 540/141 |
| 5,238,764 | 8/1993 | Molaire et al. | 430/78 |
| 5,238,766 | 8/1993 | Molaire et al. | 430/78 |
| 5,304,445 | 4/1994 | Itagaki et al. | 430/59 |
| 5,443,935 | 8/1995 | Kojima et al. | 430/78 |
| 5,614,342 | 3/1997 | Molaire et al. | 430/78 |

OTHER PUBLICATIONS

Paul M. Borsenberger and David S. Weiss, *Organic Photoreceptors for Imaging Systems*, 1993 by Marcel Dekker, Inc., New York, pp. 338–391.

H. Klug and L. Alexander, *X-ray Diffraction Procedures For Crystalline and Amorphous Materials* 2nd edition, John Wiley & Sons, (1974) pp. 791–792, 833–848.

*Nachr. Ges. Wiss. Gottingen, Math–Phys.* K1.2 (1918) pp. 98–100.

R. Jenkins and R. Snyder, *Introduction to X–ray Powder Diffractometry*, John Wiley & Sons, 89–90 (1996).

D. Hukins, *X–ray Diffraction by Disordered and Ordered Systems*, Pergamon Press, 70, (1981).

B. Honigmann, H. Lenne, and R. Schrodel, Relationships Between The Structure Of Modifications Of Plantinum Phthalocyanine And Copper Phthalocyanine And A Few Chlorine Dervatives, *Zeit. fur Kristall.*, 122, 185–205, (1965) —+Translation.

*Primary Examiner*—Christopher D. Rodee
*Attorney, Agent, or Firm*—Doreen M. Wells

[57] ABSTRACT

Amorphous and cocrystallized unsubstituted titanyl phthalocyanine-titanyl fluorophthalocyanine compositions, preparation methods, and electrophotographic elements utilizing the compositions. The method has the steps of: admixing crude titanyl phthalocyanine and crude titanyl fluorophthalocyanine to provide a pigment mixture; increasing the amorphousness of the pigment mixture as determined by X-ray crystallography using X-radiation characteristic of Cu Kα at a wavelength of 1.541 Å of the Bragg angle 2θ to provide an amorphous pigment mixture; contacting the amorphous pigment mixture with a noncrystallizing solvent.

9 Claims, 21 Drawing Sheets

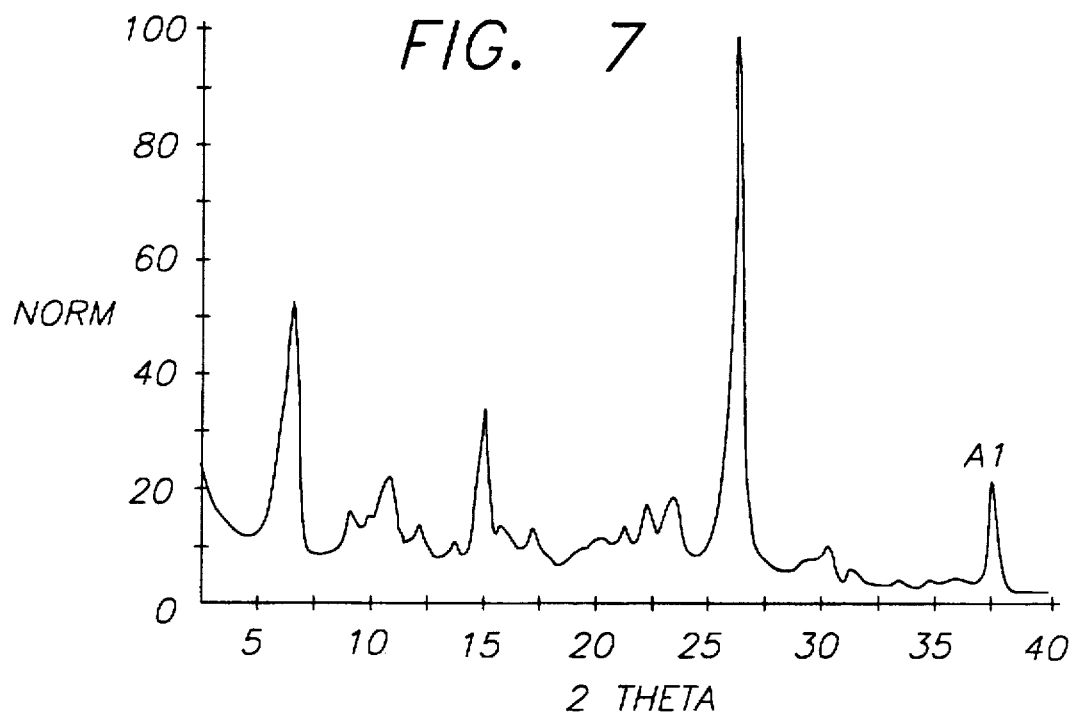
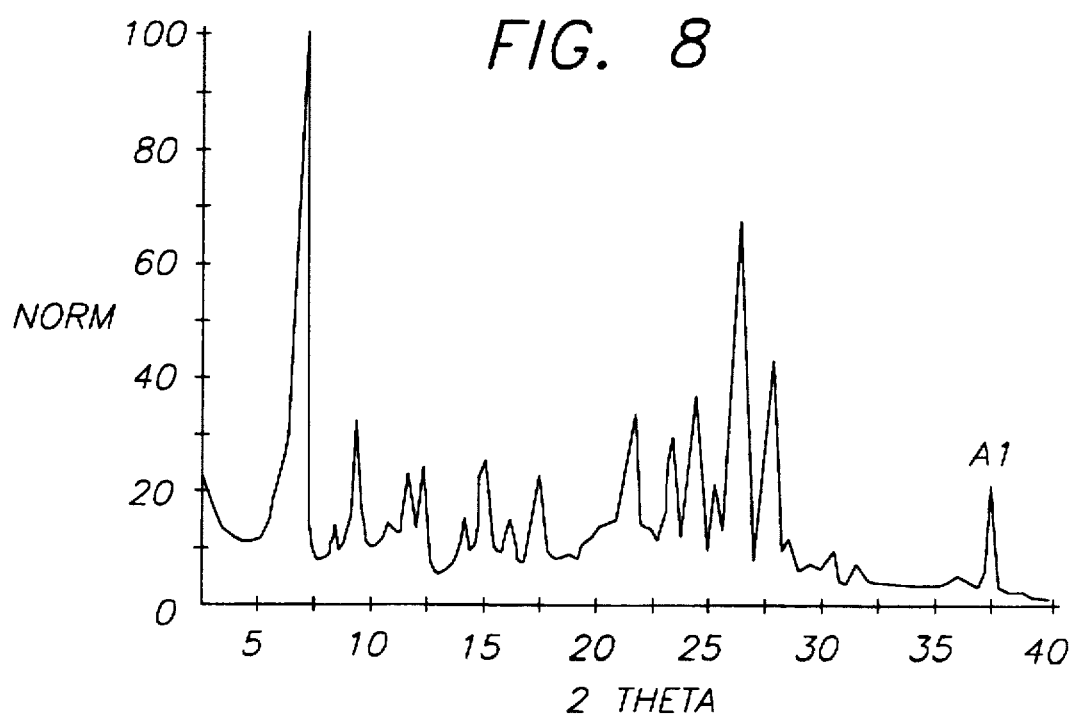

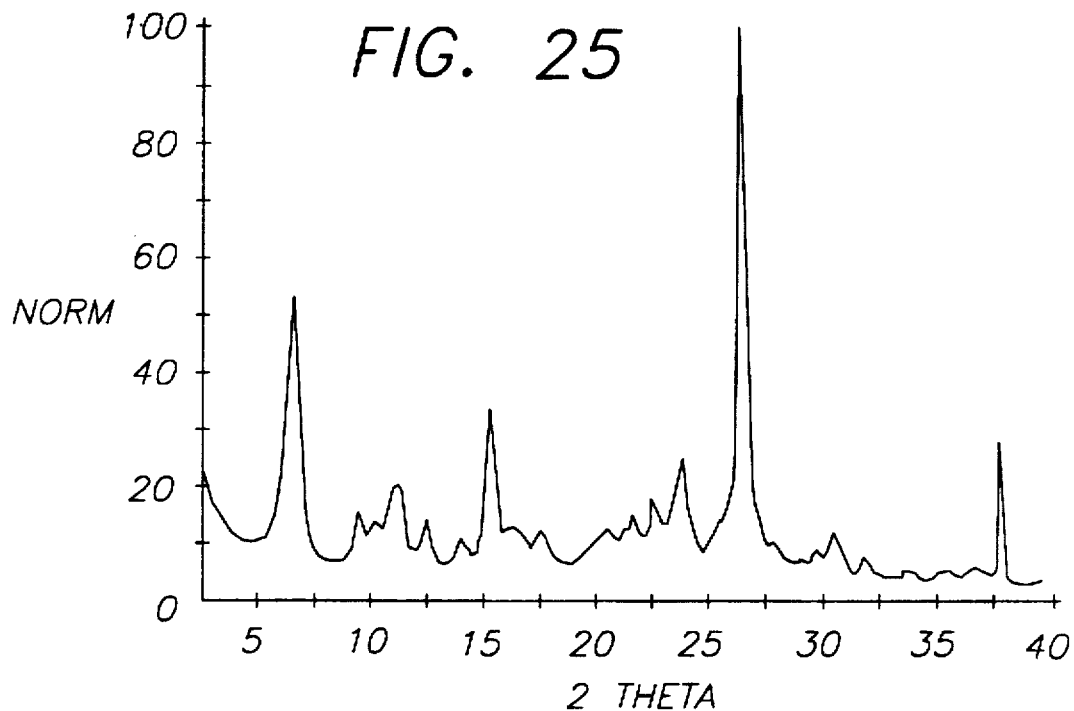
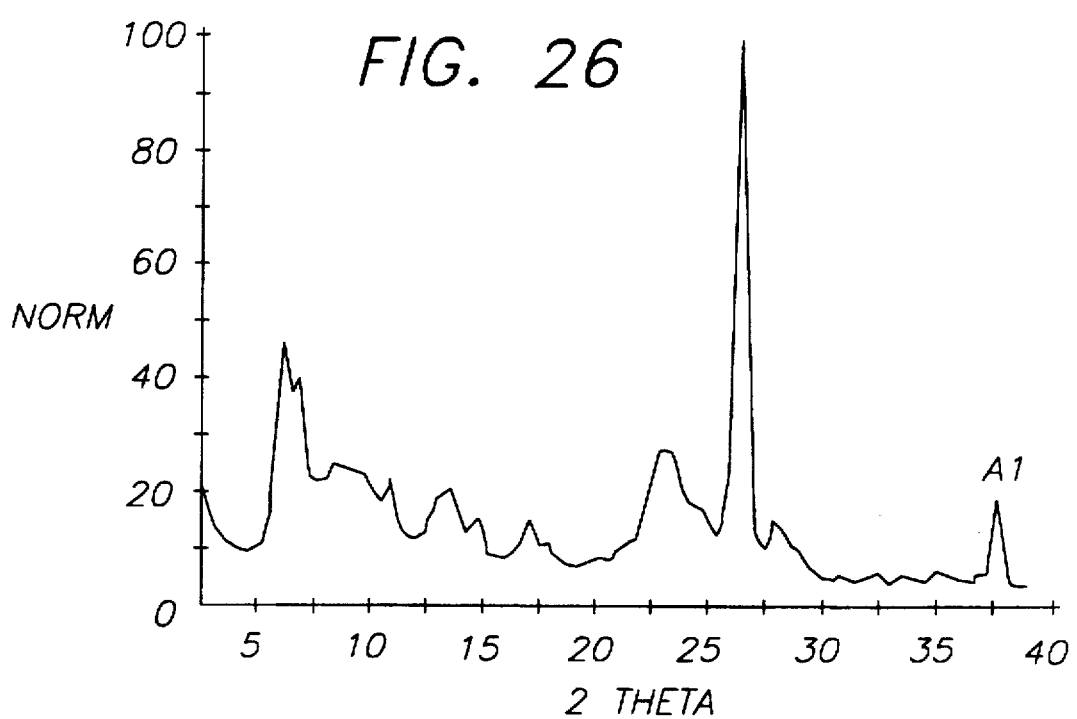

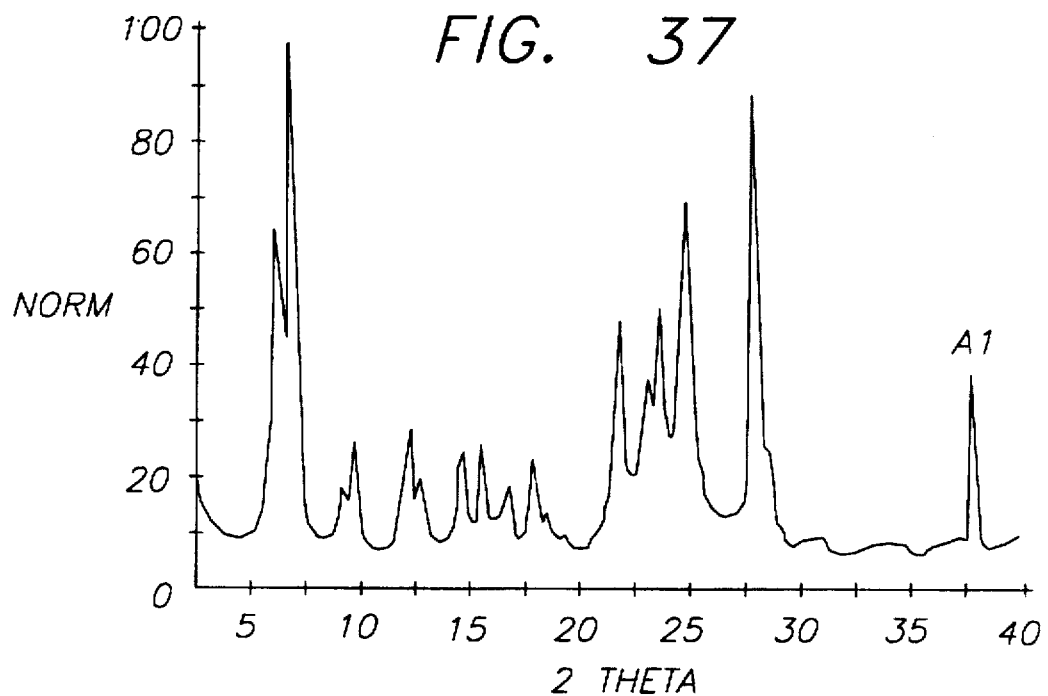
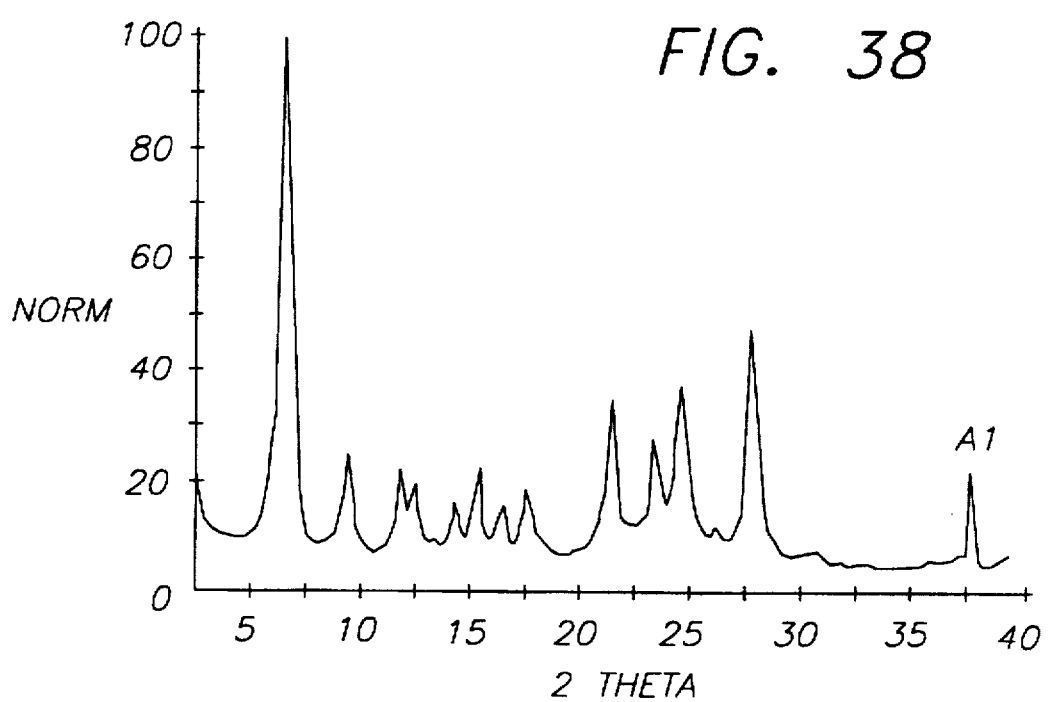

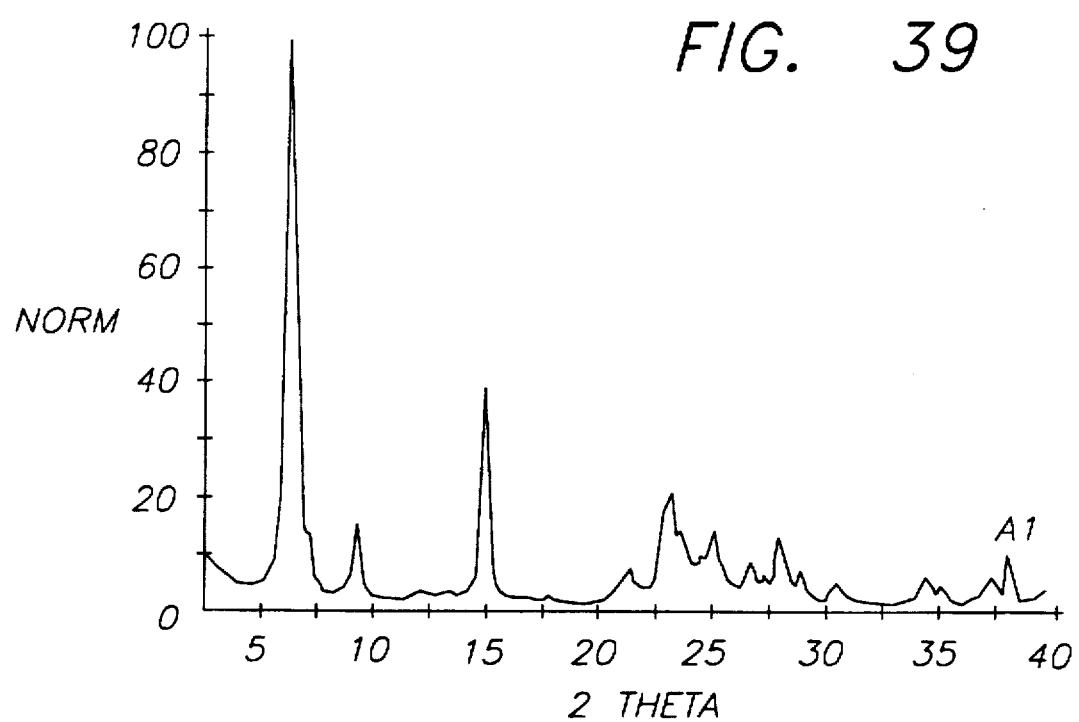

METHODS FOR PREPARING COCRYSTALS OF TITANYL FLUOROPHTHALOCYANNES AND UNSUBSTITUTED TITANYL PHTHALOCYANINE, ELECTROPHOTOGRAPHIC ELEMENTS, AND TITANYL PHTHALOCYANINE COMPOSITIONS

This is a continuation-in-part of application Ser. No. 08/434,148, filed May 2, 1995, now U.S. Pat. No. 5,614,342, issued Mar. 25, 1997 entitled "Methods for Preparing Cocrystals of Titanyl Fluorophthalocyanines and Unsubstituted Titanyl Phthalocyanine, Electrophotographic Elements, and Titanyl Phthalocyanine Compositions, incorporated herein by reference.

FIELD OF THE INVENTION

The invention relates to electrophotographic elements and related materials. The invention more particularly relates to methods of preparing an isolated amorphous pigment mixture cocrystals of titanyl fluorophthalocyanine and unsubstituted titanylphthalocyanine, to titanyl phthalocyanine compositions, and to electrophotographic elements.

BACKGROUND OF THE INVENTION

In electrophotography an image comprising a pattern of electrostatic potential (also referred to as an electrostatic latent image), is formed on a surface of an electrophotographic element comprising at least two layers: a photoconductive layer and an electrically conductive substrate. The electrostatic latent image can be formed by a variety of means, for example, by imagewise radiation-induced discharge of a uniform potential previously formed on the surface. Typically, the electrostatic latent image is then developed into a toner image by contacting the latent image with an electrographic developer. If desired, the latent image can be transferred to another surface before development.

Among the many different kinds of photoconductive materials which have been employed in electrophotographic elements are phthalocyanine pigments such as titanyl phthalocyanine and titanyl tetrafluorophthalocyanine. Electrophotographic recording elements containing such pigments as charge-generation materials are useful in electrophotographic laser beam printers because they are capable of providing good photosensitivity in the near infrared region of the electromagnetic spectrum, that is in the range of 700–900 nm.

The photoconductive layer is produced from a liquid coating composition which includes the titanyl phthalocyanine pigment and a solvent solution of polymeric binder. It is necessary that the titanyl phthalocyanine pigment be in a form, either crystalline or amorphous, that is highly photoconductive and sufficiently and stably dispersed in the coating composition to permit its being applied at a low enough concentration to form a very thin layer having high electrophotographic speed in the near infrared range. A variety of methods have been used to produce suitable forms of titanyl phthalocyanine. Different methods have commonly produced titanyl phthalocyanines having differing crystallographic characteristics. (U.S. Pat. No. 5,166,339 to Duff et al presents a table of polymorphs of unsubstituted titanyl phthalocyanine (also referred to as "TiOPc") in which materials bearing multiple designations are grouped as four types. Many types of TiOPc and other phthalocyanines are discussed in Organic Photoreceptors for Imaging Systems, P. M. Borsenberger and D. S. Weiss, Marcel Dekkar, Inc., New York, pp. 338–391.)

In one group of preparations, commonly referred to as "acid-pasting", crude titanyl phthalocyanine is dissolved in an acid solution, which is then diluted with non-solvent to precipitate the titanyl phthalocyanine product. In another group of preparations, the crude titanyl phthalocyanine is milled, generally with particular milling media. Some preparations combine techniques or modify a previously prepared titanyl phthalocyanine.

U.S. Pat. No. 5,132,197 to Iuchi et al teaches a method in which titanyl phthalocyanine was acid pasted, treated with methanol, and milled with ether, monoterpene hydrocarbon, or liquid paraffin to produce a titanyl phthalocyanine having main peaks of the Bragg angle 2θ with respect to X-rays of Cu Kα at 9.0°, 14.2°, 23.9°, and 27.1° (all +/−0.2°).

U.S. Pat. No. 5,206,359 to Mayo et al teaches a process in which titanyl phthalocyanine produced by acid pasting is converted to type IV titanyl phthalocyanine from Type X by treatment with halobenzene.

U.S. Pat. No. 5,059,355 to Ono et al teaches a process in which TiOPc was shaken with glass beads producing an amorphous material having no substantial peaks by X-ray diffraction. The amorphous material was stirred with heating in water and ortho-dichlorobenzene. Methanol was added after cooling. A crystalline material was produced which had a distinct peak at 27.3 degrees.

U.S. Pat. No. 4,882,427 to Enokida et al teaches a material having noncrystalline titanyl phthalocyanine and pseudo-non-crystalline titanyl phthalocyanine. The pseudo-noncrystalline material could be prepared by acid pasting or acid slurrying. The noncrystalline titanyl phthalocyanine could be prepared by acid pasting or acid slurrying followed by dry or wet milling, or by mechanical milling for a long time without chemical treatment.

U.S. Pat. No. 5,194,354 to Takai et al teaches that amorphous titanyl phthalocyanine prepared by dry pulverization or acid pasting can be converted, by stirring in methanol, to a low crystalline titanyl phthalocyanine having strong peaks of the Bragg angle 2 theta with respect to X-rays of Cu Kα at 7.2°, 14.2°, 24.0° and 27.2° (all +/−0.2°). The low crystalline material, it was indicated, could be treated with various organic solvents to produce crystalline materials: methyl cellosolve or ethylene glycol for material having strong peaks at 7.4°, 10.9°, and 17.9°; propylene glycol, 1,3-butanediol, or glycerine for material having strong peaks at 7.6°, 9.7°, 12.7°, 16.2°, and 26.4°; and aqueous mannitol solution for material having strong peaks at 8.5° and 10.2° (all peaks +/−0.2°).

U.S. Pat. Nos. 4,994,566 and 5,008,173, to Mimura et al teach a process in which non-crystalline particles produced by: acid pasting or slurrying then mechanical grinding, mechanical grinding for a very long time, or sublimation; are treated with tetrahydrofuran to produce the a titanyl phthalocyanine having infrared absorption peaks at 1,332; 1,074; 962; and 783 $cm^{-1}$.

U.S. Pat. No. 5,039,586 to Itami teaches acid pasting followed by milling in aromatic or haloaromatic solvent with or without additional water or other solvents such as alcohols or ethers, at 20°–100° C. In an example, crude titanyl phthalocyanine was milled with alpha-chloronaphthalene or ortho-dichlorobenzene as milling medium followed by washing with acetone and methanol. The titanyl phthalocyanine produced had a first maximum intensity peak of the Bragg angle 2-theta with respect to X-rays of Cu Kα at a wavelength of 1.541 Å at 27.3°+/−0.2°, and a second maximum intensity peak at 6.8°+/−0.2°. This was contrasted with another titanyl phthalocyanine which was similarly milled, but not acid pasted. This material had a maximum peak at 27.3°+/−0.2° and a second maximum intensity peak, in the 6°-8° range, at 7.5°+/−0.2°.

U.S. Pat. No. 5,055,368, to Nguyen et al teaches a "salt-milling" procedure in which crude titanyl phthalocyanine is milled, first under moderate shearing conditions, along with milling media comprising inorganic salt and non-conducting particles. The milling is then continued at higher shear and temperatures up to 50° C. until the pigment undergoes a perceptible color change. Solvent is substantially absent during the milling steps.

U.S. Pat. No. 4,701,396, to Hung et al, teaches near infrared sensitive photoconductive elements made from fluorine-substituted titanylphthalocyanine pigments. While phthalocyanines having only fluorine substituents, and those being equal in number on each aromatic ring, are the preferred pigments of the invention described in that patent, various non-uniformly substituted phthalocyanines are taught.

U.S. Pat. Nos. 5,238,764 and 5,238,766, both to Molaire et al, teach that titanyl fluorophthalocyanine products of acid-pasting and salt-milling procedures, unlike unsubstituted titanyl phthalocyanine, suffer a significant reduction in near infrared sensitivity when they are dispersed in a solvent such as methanol or tetrahydrofuran, which has a $gamma_c$ hydrogen bonding parameter value greater than 9.0. These patents further teach that this reduction in sensitivity can be prevented by first contacting the titanyl fluorophthalocyanine with a material having a $gamma_c$ hydrogen bonding parameter of less than 8.0.

U.S. Pat. No. 5,112,711 to Nguyen et al teaches an electrophotographic element having a physical mixture of titanyl phthalocyanine crystals and titanyl fluorophthalocyanine crystals. The element provided a synergistic increase in photosensitivity in comparison to an expected additive combination of titanyl phthalocyanine and titanyl fluorophthalocyanine. Similar elements having physical mixtures combining titanyl phthalocyanine crystals and chloro- or bromo-substituted titanyl phthalocyanine crystals produced results in which the photosensitivity was close to that of the least sensitive of the two phthalocyanines used.

The above procedures present shortcomings in the preparation of titanyl phthalocyanines. The use of acid presents a shortcoming for both environmental and safety concerns, particularly in commercial scale procedures. Salt milling avoids the use of acid, but requires extensive washing of the milled material to remove salts, which can otherwise cause high dark decay in a photoconductor. Procedures which first contact the titanyl fluorophthalocyanine with a solvent such as methanol or tetrahydrofuran, having a $gamma_c$ hydrogen bonding parameter value greater than 9.0 cause a significant reduction in near infrared sensitivity. Appropriately prepared titanyl fluorophthalocyanine has good photogeneration characteristics, but is expensive.

It is therefore desirable to provide a method for producing a crystalline titanyl phthalocyanine composition which has good photogeneration characteristics when used in an electrophotgraphic element, but is less expensive than titanyl fluorophthalocyanine. It is further desirable that the method avoid deleterious contact with high $gamma_c$ hydrogen bonding parameter solvents, and not require the use of acid or of salt milling media.

SUMMARY OF THE INVENTION

The invention, in its broader aspects, provides a method of preparing an amorphous pigment mixture, an isolated amorphous pigment mixture, cocrystallized titanyl phthalocyanine-titanyl fluorophthalocyanine compositions, preparation methods, and electrophotographic elements utilizing the compositions. The method has the steps of: admixing crude titanyl phthalocyanine and crude titanyl fluorophthalocyanine to provide a pigment mixture; and increasing the amorphousness of the pigment mixture as determined by X-ray crystallography using X-radiation characteristic of Cu Kα at a wavelength of 1.541 Å of the Bragg angle 2θ to provide an amorphous pigment mixture. Further, this invention provides the additional steps of contacting the amorphous pigment mixture with a non-crystallizing solvent; and isolating a powder referred to as the isolated amorphous pigment mixture. Further, this invention provides the additional steps of dispersing the isolated amorphous pigment mixture in a solvent having a $gamma_c$ hydrogen bonding parameter of less than 9.0, and substantially excluding the isolated amorphous pigment mixture from contact with organic solvent having a $gamma_c$ hydrogen bonding parameter greater than 9.0, to create a cocrystallized titanyl phthalocyanine-titanyl fluorophthalocyanine dispersion. Further, this invention provides the additional steps of coating the dispersion to form a photogenerating layer of an electrophotgraphic element.

It is an advantageous effect of at least some of the embodiments of the invention that compositions of matter, preparation methods and electrophotographic elements are disclosed that provide for good electrophotographic characteristics at reduced cost relative to titanyl fluorophthalocyanine.

BRIEF DESCRIPTION OF THE FIGURES

The above-mentioned and other features and objects of this invention and the manner of attaining them will become more apparent and the invention itself will be better understood by reference to the following description of an embodiment of the invention taken in conjunction with the accompanying figures wherein:

The figures are x-ray diffraction spectra that exhibit peaks of the Bragg angle 2θ with respect to x-rays of Cu K at a wavelength of 1.541 Å, for the phthalocyanines of the Preparations, Examples, and Comparative Examples as follows:

FIG. 7: Comparative Example 4;
FIG. 8: Comparative Example 5.

FIG. 25: Comparative Example 12;
FIG. 26: Comparative Example 18;
FIG. 37: Comparative Example 26;
FIG. 38: Comparative Example 27;
FIG. 39: Comparative Example 28.

DESCRIPTION OF PARTICULAR EMBODIMENTS

Figure 1:
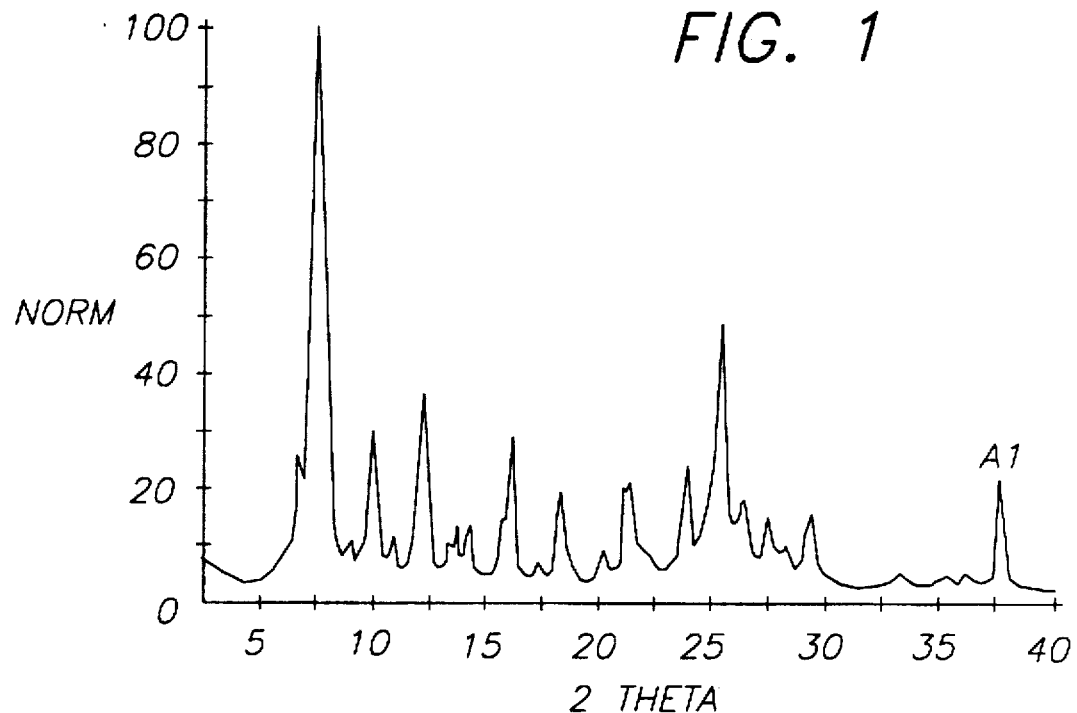
FIG. 1: Preparation 1.

In the methods of the invention, a physical mixture of crude titanyl fluorophthalocyanine and crude unsubstituted titanyl phthalocyanine (also refereed to herein as "crude pigment mixture") is converted to a composition of matter of the invention, a substantially amorphous, i.e., low crystallinity, titanyl phthalocyanine mixture (also referred to herein as "amorphous pigment mixture"). In a preferred embodiment of the invention, the "amorphous pigment mixture" is further milled with non-crystallizing solvent, e.g. water, and isolated to produce the "isolated amorphous pigment mixture" of the invention. In the preferred embodiment, the isolated amorphous pigment mixture is then dispersed in a solvent having a gamma$_c$ hydrogen bonding parameter of less than 9.0, preferably less than 8.0, to provide a high crystallinity photogenerating material (also referred to herein as "cocrystal product" or "cocrystal"), and coated as the photogenerating layer of an electrophotographic element of this invention.

Unsubstituted titanyl phthalocyanine has the structural formula:

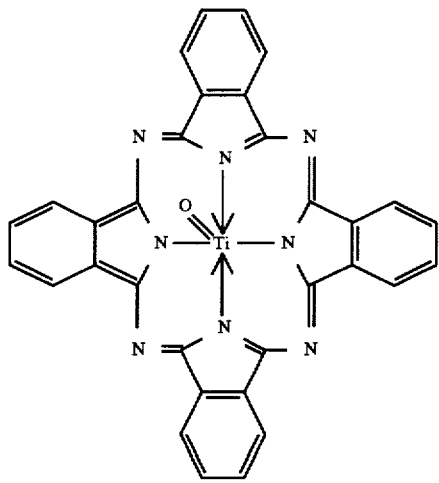

Unsubstituted titanyl phthalocyanine is sometimes abbreviated herein "TiOPc". The titanyl fluorophthalocyanines used in the invention have the general structure:

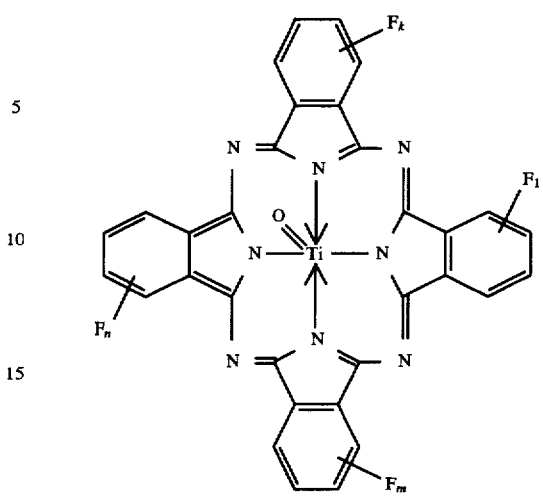

wherein each of k, l, m, n is independently an integer from 1 to 4. In a particular embodiment of the invention, the crystalline titanyl fluorophthalocyanine consists of a mixture comprising titanyl 2,9,16,23-tetrafluorophthalocyanine; titanyl 2,9,16-trifluorophthalocyanine; 2-monofluorophthalocyanine; titanyl 2,9-difluorophtalocyanine; and titanyl 2,16-difluorophthalocynanine. Titanyl fluorophthalocyanine is sometimes abbreviated herein "TiFOPc".

The composition of the mixture and their electrophotographic properties can be manipulated through varying the weight ratio of the fluorophthalocyanines, (where n=1 to 99% is the weight ratio of fluorophthalocyanine). The characteristics of the phthalocyanines combined to form the crude mixture are determined by the desired photogeneration characteristics of the final product. A mixture of fluorophtalocyanines can be used as long as the total percent of fluorophthalocyanines is consistent to the formula:

100−X=Y>0, where Y is the percent of unsubstituted phthalocyanine.

The crude titanyl phthalocyanine and titanyl fluorophthalocyanine are first admixed together. The crude materials can be synthesized by a number of well-known procedures, for example, the procedures described in U.S. Pat. No. 4,701, 396. As synthesized, titanyl phthalocyanine pigments normally have a particle size that is too large for them to be effectively used in electrophotographic applications. In this condition, they are known in the art as "crude" pigments. Such crude pigments normally have a particle size in excess of 10 micrometers, often a particle size of at least 50 micrometers, and in some cases, at least 1 millimeter. The term "particle size" is used herein to refer to the largest dimension of an individual particle and the median value of the same parameter for the particles of a particulate. Particle size can be readily determined from electron photomicrographs using techniques well known to those skilled in the art.

After admixing, the crude pigment mixture is rendered amorphous. The crystallographic characteristics discussed herein, i.e., amorphousness and crystallinity, are based upon X-ray diffraction spectra at the Bragg angle 2-theta using Cu Ka X-radiation at a wavelength of 1.541 Å and are +/−0.2° unless otherwise indicated. Suitable X-ray diffraction techniques are described, for example, in Engineering Solids, T. S. Hutchinson and D. C. Baird, John Wiley and Sons, Inc., 1963 and X-ray Diffraction Procedures for Polycrystalline and Amorphous Materials, 2nd Ed., John Wiley and Sons, Inc., 1974.

In the method for preparing the isolated amorphous pigment mixture of the invention, dry milling is the preferred procedure for rendering the crude pigment mixture amorphous, although other techniques can be used. For example, the crude pigment mixture can be acid pasted or salt milled; however, these procedures have the shortcomings previously discussed.

In dry milling, the crude pigment mixture is mechanically ground in the dry state under shear conditions that break up particle agglomerates, reduce the particle size, and render the mixture less crystalline, i.e. more amorphous. It is preferred that dry milling be continued until the pigment mixture is rendered substantially or fully amorphous. The term "fully amorphous", as used herein, refers to a crystalline/amorphous state in which the well defined peaks of the crude phthalocyanine are replaced by a very high baseline response modulated by a few very broad, 5°–10° or wider peaks.

The dry milling procedure is carried out in the substantial absence of any solvent, or polymeric binder, or salt; that is, if there is any of these materials present, the amount is so small as to have no effect, or at least no adverse effect, on the pigment amorphous characteristics.

Milling apparatus capable of providing the necessary shear are well known and include, for example, conventional ball mills, roll mills, paint shakers, vibrating mills, and the apparatus described in U.S. Pat. Nos. 4,555,467 and 4,785,999. The shear employed is varied, as is well known to those skilled in the art, depending upon such factors as the type of milling apparatus, milling aids such as steel balls, and the crude pigment mixture used. The energy applied in the first milling stage generally does not exceed about 5 watts, and is typically from about 3 to 5 watts. Enough energy is applied to convert the crude pigment mixture to a low crystallinity pigment mixture.

The milling apparatus used during the dry milling stage may or may not require the use of particulate milling aids: materials added to the pigment particles to increase shear and decrease milling time. Particulate milling aids suitable for use in the claimed invention are materials which can be easily removed from the milled pigment mixture. For example, the salts described as milling aids in U.S. Pat. No. 5,055,368 are not desirable for use as particulate milling aids in the claimed invention, because the salts themselves are degraded to very small size by milling and must be removed by extensive washing. Examples of preferred particulate milling aids are steel shot, ceramic, glass, and zirconia media. These aids typically are available in sizes from about 0.5 to about 5 millimeters in diameter. Typically, the concentration of the pigment mixture during milling is from about 2 to 25 weight percent relative to the total weight of the pigment mixture and the milling media.

The dry milling time will vary greatly depending upon a number of factors such as relative proportions of pigment mixture and milling aid and the specific milling equipment used. Generally, a suitable time for the dry milling stage may be as much as 240 hours with typical times being in the range of from about 0.5 to 120 hours.

Milling tends to result in the liberation of heat, which would raise the temperature of the milled composition. It is desirable that the milling apparatus include temperature regulating means which can help increase or decrease the temperature up to a temperature below the decomposition temperature of the phthalocyanine pigments, or preferably in the range of about 0° to about 150° C., or more preferably from about 40° C. to about 100° C.

In a particular embodiment of the invention, the milling is performed in a Sweco Vibro Energy grinding mill manufactured by Sweco, Inc. of Florence, Ky. Stainless steel beads, 2 mm in diameter, are added as a milling media on a 90 weight/weight percent basis relative to the weight of the pigment mixture. The pigment mixture is milled for a time period of from 12 to 96 hours at temperatures within the range of 25° C. to 60° C.

The present inventors have surprisingly found that, under the same dry milling conditions, the crude pigment mixture of the invention dry mills faster than either unsubstituted titanyl phthalocyanine alone or titanyl fluorophthalocyanine alone.

The amorphous pigment mixture produced by dry milling has a photosensitivity, especially to red and near-infrared radiation, comparable to that of the corresponding acid pasted or salt milled material. The fully amorphous pigment mixture of the invention shows only three very broad peaks of the Bragg angle at 7.2°, 15.4°, and 25.5° (all +/−0.2°).

The isolated amorphous pigment mixture is produced by adding a non-crystallizing solvent to the amorphous pigment mixture, milling the amorphous pigment mixture in the non-crystallizing solvent to form a slurry, and after a suitable milling time, removing the amorphous pigment mixture from the slurry and milling media, if any, to produce the isolated amorphous pigment mixture.

Prior to the following contacting step, the amorphous pigment mixture should be excluded from contact with organic solvent having a $gamma_c$ hydrogen bonding partner of greater than 9.0.

The non-crystallizing solvent added to the amorphous pigment mixture can be any solvent which does not effect the crystallization of the pigment mixture. (The crystallization of the pigment mixture can be accessed by X-ray crystallography of the amorphous pigment mixture and the isolated amorphous pigment mixture.) An example of a non-crystallizing solvent is water. The amorphous pigment mixture in the non-crystallizing solvent can be milled for 2 to 48 hours, preferably 24 hours, however, longer and shorter milling times may be appropriate depending on the milling method. The amorphous pigment mixture is preferably removed from the slurry and milling media by filtering; however any suitable separation method can be used, such as, centrifugation.

The isolated amorphous pigment mixture of the invention exhibits a distinctive crystallogram having only three major peaks of the Bragg angle 2-theta with respect to X-rays of Cu Ka at the wavelengths of 1.541 Å at 7.2°, 15.4°, and 25.5° (all +/−0.2°).

The electrophotographic elements of the invention incorporate the isolated amorphous pigment mixture and have greater photosensitivity than similarly prepared elements having either similarly treated titanyl fluorophthalocyanine or unsubstituted phthalocyanine. In preparing the elements, the isolated amorphous pigment mixture, binder and any desired addenda, are dissolved or dispersed together in a solvent having a $gamma_c$ hydrogen bonding parameter of less than 9.0, preferably less than 8.0, the cocrystal product of the invention is produced by contacting the amorphous pigment mixture of the invention with an organic solvent having a $gamma_c$ hydrogen bonding parameter value less than 9.0, or preferably less than 8.0, before the pigment mixture comes into contact with any organic solvent having a $gamma_c$ hydrogen bonding parameter value greater than 9.0 to form a charge generating coating composition which is then coated over an appropriate underlayer. The liquid is then allowed or caused to evaporate to form the charge generation layer of the invention.

The pigment referred to as "cocrystal" in the photogenerating layer of the electrophotographic element of the invention exhibits a distinctive crystallogram having major peaks of the Bragg angle 2-theta with respect to X-rays of Cu Ka at a wavelength of 1.541 Å at 7.4°, 10.1°, 12.7°, 13.2°, 14.9°, 15.9°, 17.4°, 18.6°, 22.4°, 24.3°, 25.6°, 28.8° (all +/–0.2°). This distinctive spectrum is clearly seen over a weight-:weight ratio of unsubstituted titanyl phthalocyanine to titanyl fluorophthalocyanine of from 95:5 to 30:70. X-ray diffraction spectra outside this range are in accord with an explanation that the crystalline product in those instances is a combination of exhibiting the same peaks and crystals of unsubstituted titanyl phthalocyanine or titanyl fluorophthalocyanine.

The crystallogram of the cocrystal is different than the crystallograms of highly crystalline unsubstituted titanyl phthalocyanine or highly crystalline titanyl fluorophthalocyanine prepared in the same manner as the cocrystal (dry milled, dry milled with a non-crystallizing solvent, isolated, and then added to a coating composition). The crystallogram is also different than the crystallogram of a physical mixture of highly crystalline unsubstituted titanyl phthalocyanine and highly crystalline titanyl fluorophthalocyanine prepared in the same manner as the cocrystal and then mixed together. The cocrystal product most closely resembles highly crystalline unsubstituted titanyl phthalocyanine.

The distinctive spectrum is surprising. Even more surprising is that the cocrystal product of the invention exhibits substantially improved electrophotographic sensitivity over either titanyl fluorophthalocyanine, or the unsubstituted titanyl phthalocyanine, prepared in the same manner. The cocrystal can provide electrophotographic elements that are very fast, and have reasonably low dark decay. For example, in particular embodiments of the invention, dark decay for electrophotographic elements using the cocrystal is lower than that for similar elements using the unmilled, untreated mixtures of U.S. Pat. No. 5,112,711.

Gamma$_c$ hydrogen bonding parameter values of organic solvents can be determined by the method reported in "A Three-Dimensional Approach to Solubility", J. D. Crowley, G. S. Teague, and J. W. Lowe, Journal of Paint Technology, Vol. 38, No. 496, May 1966, pp. 269–280 and further described in CRC Handbook of Solubility Parameters and Other Cohesion Parameters, A. Barton, CRC Press, Boca Raton, Fla., 1983, pp. 174 and 179–180 and in the ASTM D3132 standard test method. The method comprises measuring the effect of the solvent on deuterated methanol in terms of the frequency of the infrared radiation absorbed by the O—D bond of deuterated methanol and comparing that effect to the effect of benzene on the same bond. The value of the gamma$_c$ hydrogen bonding parameter for the solvent being tested is then determined in accordance with the equation:

$$gamma_c = \{(nu_{benzene}) - (nu_{solvent})\}/10$$

where "nu$_{benzene}$" is the wave number (expressed as cm$^{-1}$) of the infrared radiation absorbed by the O—D bond of deuterated methanol in contact with benzene, and "nu$_{solvent}$" is the wave number of the infrared radiation absorbed by the O—D bond of deuterated methanol in contact with the solvent being tested. Gamma$_c$ hydrogen bonding parameter values of numerous organic solvents have been determined. A list for some common solvents is presented in Table 1.

TABLE 1

| Solvent | Gamma$_c$ hydrogen bonding parameter value |
|---|---|
| benzene | 0.0 |
| dichloromethane | 1.5 |
| 1,1,2-trichloroethane | 1.5 |
| chlorobenzene | 1.5 |
| dichloropropane | 1.5 |
| chloroform | 1.5 |
| ethylene chloride | 1.5 |
| toluene | 4.5 |
| xylene | 4.5 |
| acetonitrile | 6.3 |
| methyl benzoate | 6.3 |
| anisole | 7.0 |
| diethyl ketone | 7.7 |
| methyl ethyl ketone | 7.7 |
| methyl isobutyl ketone | 7.7 |
| acetone | 9.7 |
| butyrolactone | 9.7 |
| dioxane | 9.7 |
| tetrahydrofuran | 9.9 |
| cyclohexanone | 11.7 |
| N,N-dimethylformamide | 11.7 |
| 2-ethoxyethanol | 13.0 |
| ethanol | 18.7 |
| methanol | 18.7 |
| butanol | 18.7 |
| pyridine | 18.1 |
| ethylene glycol | 20.6 |

The electrophotographic elements of the invention can be of various types, including both those commonly referred to as single layer or single-active-layer elements and those commonly referred to as multiactive, or multi-active-layer elements. The electrophotographic elements of the invention preferably have multiple layers, comprising at least an electrically conductive layer and one photogenerating (charge generation) layer, that is, a layer which includes, as a charge generation material, a composition of matter including the cocrystal of the invention.

In the coating composition, the optimum ratio of phthalocyanine cocrystal to binder or of cocrystal and charge transport material to binder can vary widely, depending on the particular materials employed. In general, useful results are obtained when the total concentration of both phthalocyanine and charge transport material in a layer is within the range of from about 0.01 to about 90 weight percent, based on the dry weight of the layer. In a preferred embodiment of a single active layer electrophotographic element of the invention, the coating composition contains from about 10 to about 70 weight percent of a charge-transport agent and from 0.01 to about 20 weight percent of the cocrystal of the invention. In a preferred embodiment of a multiple active layer electrophotographic element of the invention, the coating composition contains from about 0 to about 50 weight percent of a charge-transport agent and from 0.01 to about 80 weight percent of cocrystal of the invention.

Single-active-layer elements are so named because they contain only one layer that is active both to generate and to transport charges in response to exposure to actinic radiation. Such elements have an additional electrically conductive layer in electrical contact with the photoconductive layer. In single-active-layer elements of the invention, the photoconductive layer contains the cocrystal of the invention as charge-generation material to generate electron/hole pairs in response to actinic radiation and a charge-transport material, which is capable of accepting the charges generated by the charge-generation material and transporting them through the layer to effect discharge of the initially uniform electrostatic potential. The charge-transport agent and cocrystal of the invention are dispersed as uniformly as possible in the photoconductive layer. The photoconductive layer also contains an electrically insulative polymeric film-forming binder. The photoconductive layer is electrically insulative except when exposed to actinic radiation.

Multiactive layer elements are so named because they contain at least two active layers, at least one of which is capable of generating charge, that is, electron/hole pairs, in response to exposure to actinic radiation and is therefore referred to as a charge-generation layer (CGL), and at least one of which is capable of accepting and transporting charges generated by the charge-generation layer and is therefore referred to as a charge-transport layer (CTL). Such elements typically comprise at least an electrically conductive layer, a CGL, and a CTL. Either the CGL or the CTL is in electrical contact with both the electrically conductive layer and the remaining CTL or CGL. The CGL contains the cocrystal of the invention as charge-generation material, and a polymeric binder. The CTL contains a charge-transport agent, and a polymeric binder.

Single-active-layer and multiactive layer electrophotographic elements and their preparation and use in general, are well known and are described in more detail, for example, in U.S. Pat. Nos. 4,701,396; 4,666,802; 4,578,334; 4,719,163; 4,175,960; 4,514,481 and 3,615,414.

In preparing the electrophotographic elements of the invention, the components of the photoconductive layer (in single-active-layer elements) or CGL (in multiactive layer elements), including the isolated amorphous pigment mixture, binder and any desired addenda, are dissolved or dispersed together in a solvent having a gamma$_c$ hydrogen bonding parameter of less than 9.0, preferably less than 8.0 to form an electrophotographic coating composition which is then coated over an appropriate underlayer, for example, a support or electrically conductive layer. The liquid is then allowed or caused to evaporate from the mixture to form the permanent photoconductive layer or CGL. The isolated amorphous pigment mixture can be mixed with the solvent solution of polymeric binder immediately or can be stored for some period of time before making up the coating composition.

The polymeric binder used in the preparation of the coating composition can be any of the many different binders that are useful in the preparation of electrophotographic layers. The polymeric binder is a film-forming polymer having a fairly high dielectric strength. In a preferred embodiment of the invention, the polymeric binder also has good electrically insulating properties. The binder should provide little or no interference with the generation and transport of charges in the layer. The binder can also be selected to provide additional functions. For example, adhering a layer to an adjacent layer; or, as a top layer, providing a smooth, easy to clean, wear-resistant surface.

Representative binders are film-forming polymers having a fairly high dielectric strength and good electrically insulating properties. Such binders include, for example, styrene-butadiene copolymers; vinyl toluene-styrene copolymers; styrene-alkyd resins; silicone-alkyd resins; soya-alkyd resins; vinylidene chloride-vinylchloride copolymers; poly(-vinylidene chloride); vinylidene chloride-acrylonitrile copolymers; vinyl acetate-vinyl chloride copolymers; poly(vinyl acetals), such as poly(vinyl butyral); nitrated polystyrene; poly(methylstyrene); isobutylene polymers; polyesters, such as poly{ethylene-coakylenebis(alkyleneoxyaryl) phenylenedicarboxylate}; phenol-formaldehyde resins; ketone resins; polyamides; polycarbonates; polythiocarbonates;poly{ethylen-co-isopropyliden-2,2-bis(ethylenoxyphenylene)-te rephthalate}; copolymers of vinyl haloacrylates and vinyl acetate such as poly(vinyl-m-bromobenzoate-covinyl acetate); chlorinated poly(olefins), such as chlorinated poly (ethylene); cellulose derivatives such as cellulose acetate, cellulose acetate butyrate and ethyl cellulose; and polyimides, such as poly{1,1,3-trimethyl-3-(4'-phenyl)-5-indane pyromellitimide}. Examples of binder polymers which are particularly desirable from the viewpoint of minimizing interference with the generation or transport of charges include: bisphenol A polycarbonates and polyesters such as poly[(4,4'-norbornylidene)diphenylene terephthalate-co-azelate].

Suitable organic solvents for forming the polymeric binder solution can be selected from a wide variety of organic solvents, including, for example, aromatic hydrocarbons such as benzene, toluene, xylene and mesitylene; ketones such as acetone, butanone and 4-methyl-2-pentanone; halogenated hydrocarbons such as dichloromethane, trichloroethane, methylene chloride, chloroform and ethylene chloride; ethers including ethyl ether and cyclic ethers such as dioxane and tetrahydrofuran; other solvents such as acetonitrile and dimethylsulfoxide; and mixtures of such solvents. The amount of solvent used in forming the binder solution is typically in the range of from about 2 to about 100 parts of solvent per part of binder by weight, and preferably in the range of from about 10 to 50 parts of solvent per part of binder by weight.

Polymeric binders useful for the CGL or photoconductor layer can also be used in producing a CTL. Any charge transport material can be utilized in elements of the invention. Such materials include inorganic and organic (including monomeric organic, metallo-organic and polymeric organic materials); for example, zinc oxide, lead oxide, selenium, phthalocyanine, perylene, arylamine, polyarylalkane, and polycarbazole materials, among many others. The CTL can be solvent coated or can be produced in some other manner, for example, by vacuum deposition.

CGL's and CTL's in elements of the invention can optionally contain other addenda such as leveling agents, surfactant, plasticizer, sensitizers, contrast control agents, and release agents, as is well known in the art.

Various electrically conductive layers or supports can be employed in electrophotographic elements of the invention, for example, paper (at a relative humidity above 20 percent) aluminum-paper laminates; metal foils such as aluminum foil, zinc foil, and the like; metal plates such as aluminum, copper, zinc, brass and galvanized plates; vapor deposited metal layers such as silver, chromium, vanadium, gold, nickel, aluminum and the like; and semiconductive layers such as cuprous iodide and indium tin oxide. The metal or semiconductive layers can be coated on paper or conventional photographic film bases such as poly(ethylene terephthalate), cellulose acetate, polystyrene, etc. Such conducting materials as chromium, nickel, etc. can be vacuum-deposited on transparent film supports in sufficiently thin layers to allow electrophotographic elements so prepared to be exposed from either side.

Electrophotographic elements of the invention can include various additional layers known to be useful in electrophotographic elements in general, for example, subbing layers, overcoat layers, barrier layers, and screening layers.

The following Examples and Comparative Examples are presented to further illustrate some preferred modes of practice of the invention.

UV-visible-near, infrared absorption spectra were recorded on a Perkin-Elmer Lambda 9 spectrophotometer.

Infrared spectra were recorded on a Beckman IR 4250 instrument or a Perkin-Elmer 298 infrared spectrophotometer. Microanalyses were performed on a Perkin-Elmer 240 degree C, H, and N Analyzer. All X-ray diffraction analyses discussed herein were conducted with Cu Ka radiation at Bragg angles 2-theta (+/−0.2°). Unless otherwise indicated, all starting materials were commercially obtained.

Preparation 1:
Preparation of Crude Unsubstituted Titanyl Phthalocyanine.

Phthalonitrile (1100 grams) and titanium tetrachloride (813 grams) were suspended in 6800 ml of 1-chloronaphthalene and heated to 215°–220° C. and maintained for 2.5 hours at this temperature. The reaction mixture was cooled to 140° C., and the dark solid was collected, and washed with acetone, and methanol. After drying, the dark blue solid (1090 grams) was refluxed five times for two hours in 10 liters of distilled water, filtered, to yield crude titanyl phthalocyanine. The x-ray diffraction spectrum (FIG. 1) exhibited major peaks of the Bragg angle at 7.5°, 8.3°, 10.5°, 12.7°, 14.2°, 14.6°, 18.9°, 22.1°, 24.3°, 26.1°, 29.9° (all +/−0.2°).

Preparation 2:
Preparation of Crude Titanyl Tetrafluorophthalocyanine.

Figure 2:
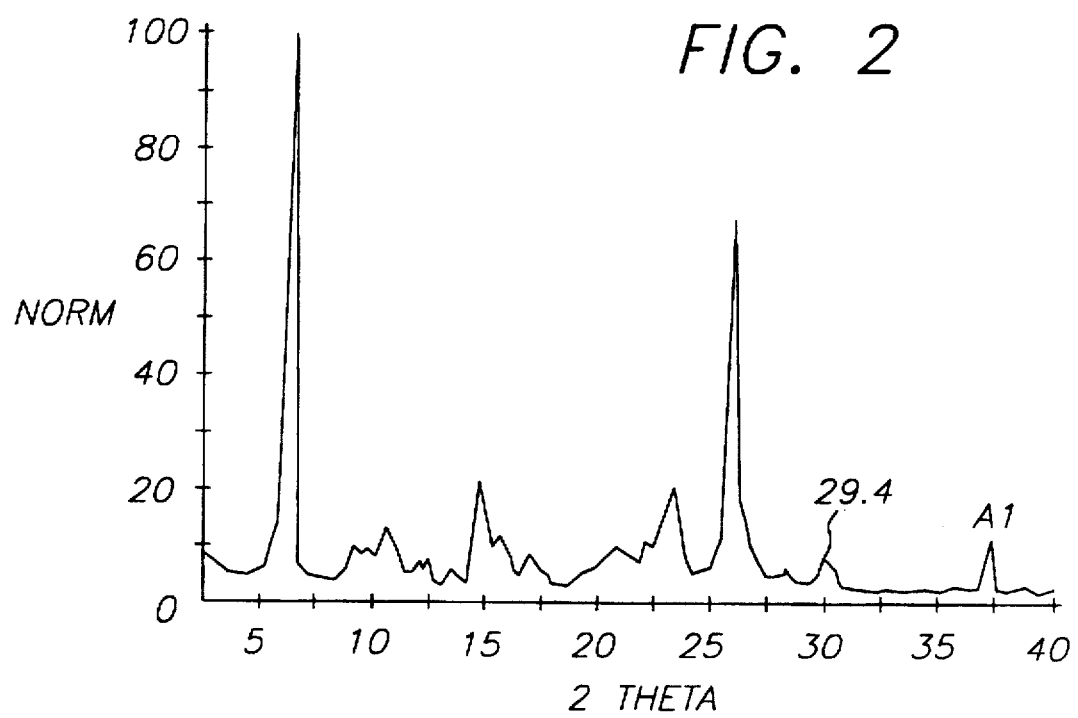
FIG. 2: Preparation 2.

Fluorophthalonitrile (38.7 grams, 0.267 mole) and titanium tetrachloride (20.7 grams, 0.134 mole) were suspended in 200 ml of 1-chloronaphthalene and heated to 205°±5° C. and maintained for 2 hours at this temperature. The reaction mixture was cooled slightly, and the dark solid was collected and washed with acetone and methanol. The dark blue solid (34 grams) was refluxed in water several times until the filtrate was neutral. The pigment was rinsed with acetone and methanol, and dried to yield crude titanyl tetrafluorophthalocyanine. The x-ray diffraction spectrum (FIG. 2) exhibited major peaks of the Bragg angle at 7.4°, 10.6°, 11.5°, 11.8°, 15.8°, 16.5°, 18.1°, 23.2°, 24.3°, 27.1°, 31.2° (all +/−0.2°)

Comparative Example 1:
Dry Milling of Unsubstituted Titanyl Phthalocyanine.

10 grams of crude titanyl phthalocyanine, prepared as described in Preparation 1, was mixed in a 16 ounce jar with 100 grams of 3 mm steel beads. The pigment mixture sample was then milled for three days using a Sweco Vibro Energy grinding mill manufactured by Sweco, Inc. The pigment particles were completely fused, coating the stainless steel beads, and agglomerating at the bottom of the jar in one big mass. The mass was broken down, and samples taken for x-ray diffraction analysis. The x-ray diffraction spectrum (FIG. 3) exhibits major peaks of the Bragg angle at 7.2°, 8.3°, 10.5°, 12.8°, 14.2°, 14.8°, 16.9°, 18.2°, 19.1°, 22.1°, 33.5°.

Figure 3:
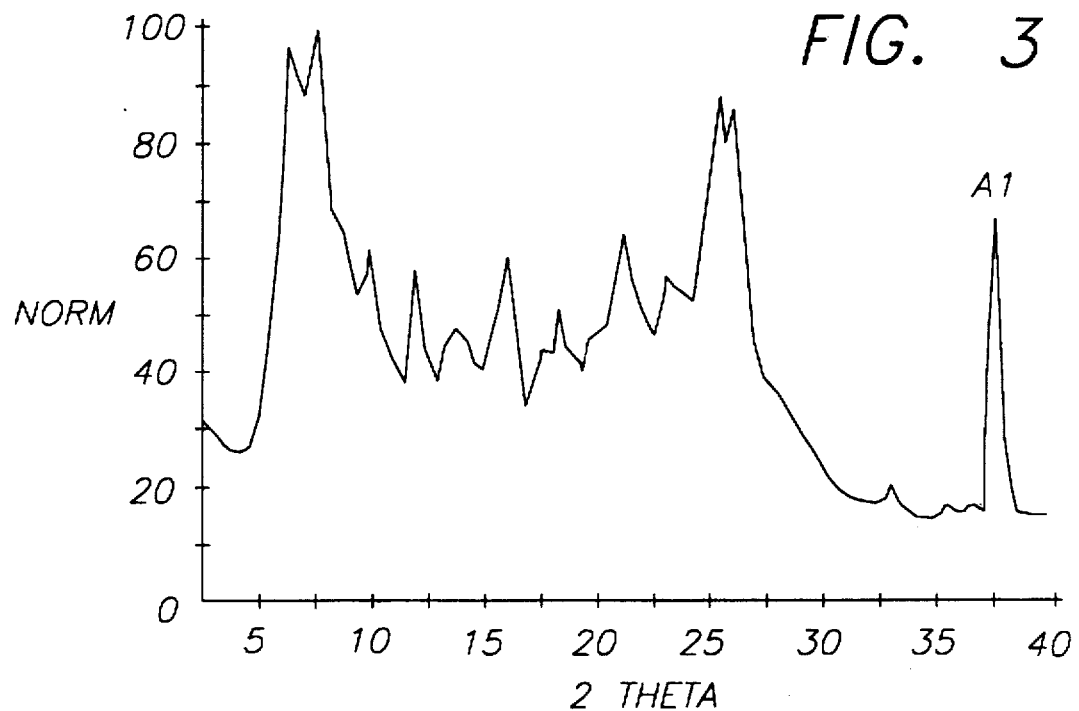
FIG. 3: Comparative Example 1.

The peaks in FIG. 3 are broad, but there is still peak definition suggesting the presence of highly crystalline material.

Comparative Example 2:
Dry Milling of Titanyl Fluorophthalocyanine.

Figure 4:
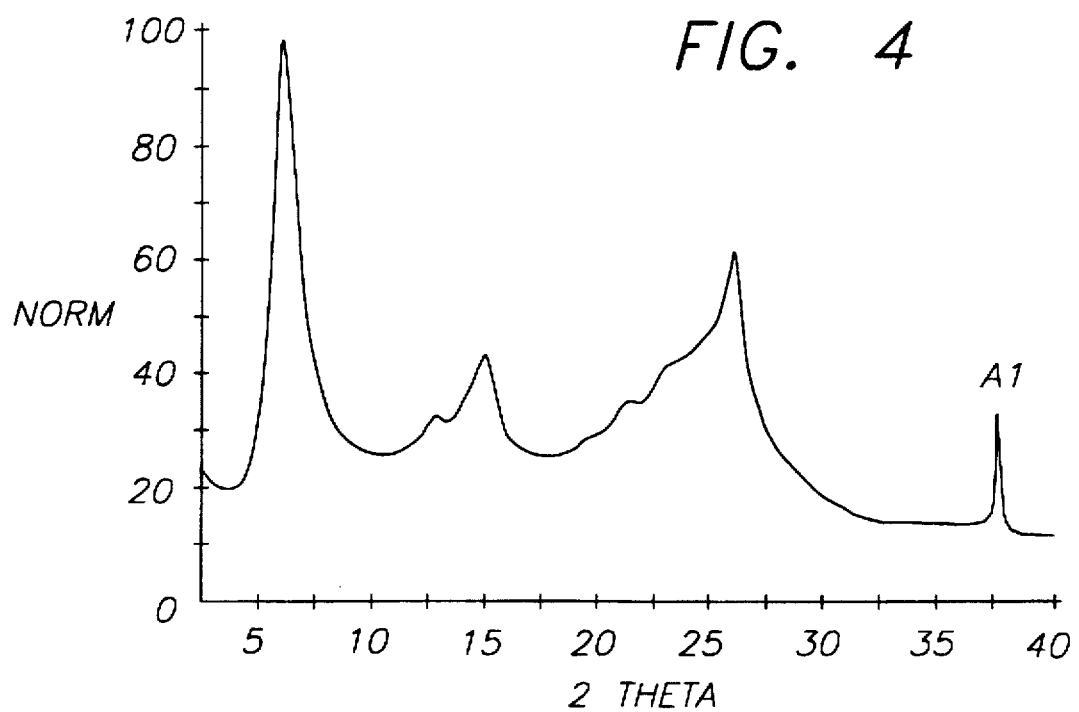
FIG. 4: Comparative Example 2.

10 grams of crude titanyl fluorophthalocyanine, prepared as described in Preparation 2, was mixed in a 16 oz jar with 100 grams of 3 mm steel beads. The pigment was then milled for three days using a Sweco Vibro Energy grinding mill manufactured by Sweco, Inc. The pigment particles were completely fused, coating the stainless steel beads, and agglomerating at the bottom of the jar in one big mass. The mass was broken down, and samples were taken for x-ray diffraction analysis. The x-ray diffraction spectrum (FIG. 4) exhibits major peaks of the Bragg angle 2-theta at 6.80°, 13.3°, 15.8°, 23.5°, and 26.9° (all +/−0.2°).

The diffractogram is somewhat broad, but the presence of material with high crystallinity is indicated by the presence of some peaks that show some definition.

Example 1:
Dry Milling of a 50:50 wt/wt Mixture of Unsubstituted Phthalocyanine, and Titanyl Fluorphthalocyanine.

Figure 5:
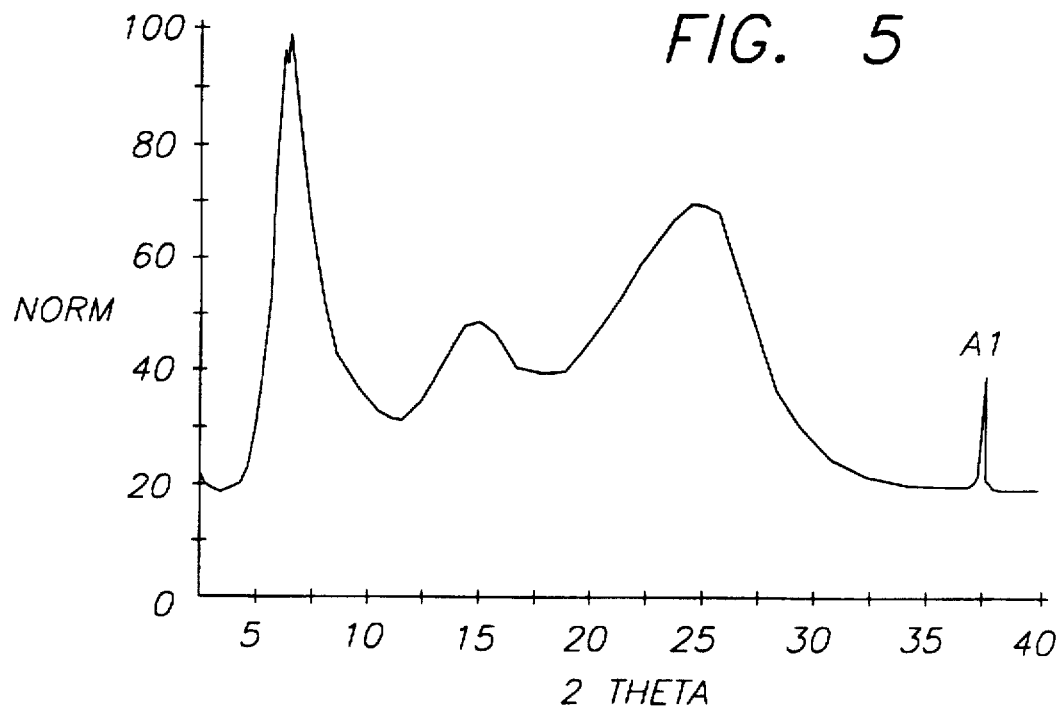
FIG. 5: Example 1.

Substantially the same procedures were followed as in Comparative Example 1, except that 5 grams of titanyl phtalocyanine and 5 grams of titanyl fluophthalocyanine (prepared as described in Preparations 1 and 2, respectively) were mixed together, then dry milled. The x-ray diffraction spectrum (FIG. 5) exhibited major peaks of the Bragg angle 2-theta at 7.2°, 15.4°, and 25.5° (all +/−0.2°).

The crystallogram is totally different from the crystallograms of Comparative Examples 1 and 2 and is very broad indicative of a material that is non-crystalline or with very low crystallinity.

Comparative Example 3:
Dichloromethane Treatment of Dry-Milled Unsubstituted Titanyl Phthalocyanine.

Figure 6:
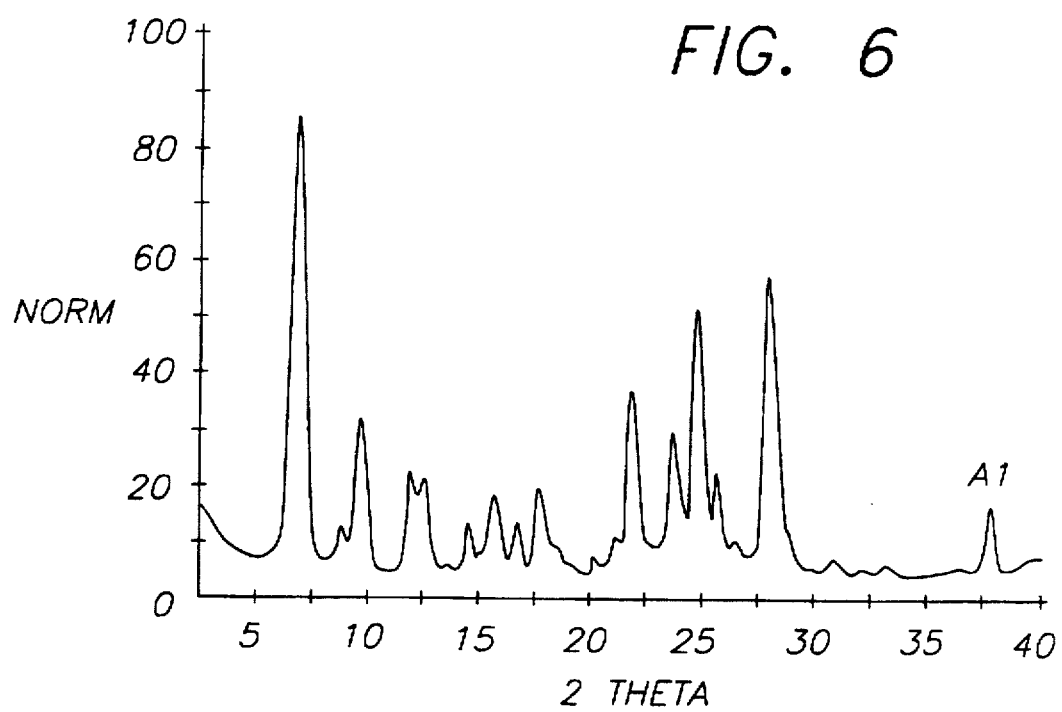
FIG. 6: Comparative Example 3.

To approximately 5 grams of the product of Comparative Example 1, 200 grams of dichloromethane were added. The pigment was then wet milled for 48 hours. Then the beads were separated, and the pigment was filtered, washed with dichloromethane, and dried. The x-ray diffraction spectrum (FIG. 6) exhibited major peaks of the Bragg angle 2-theta at 7.3°, 10.0°, 11.6°, 12.9°, 15.8°, 16.9°, 18.1°, 23.1°, 24.2°, 27.0°, and 31.17° (all +/−0.2°).

Comparative Example 4:
Dichloromethane Treatment of Dry-Milled Titanyl Fluorophthalocyanine.

To approximately 5 grams of the product of Comparative Example 2, 200 grams of dichloromethane were added. The mixture was wet milled for 48 hours. Then the beads were separated and the pigment was filtered, washed with dichloromethane, and dried. The x-ray diffraction spectrum (FIG. 7) exhibited major peaks of the Bragg angle 2-theta at 7.5°, 9.3°, 10.2°, 12.6°, 13.2°, 15.1°, 15.7°, 17.2°, 18.3°, 22.5°, 24.2°, 25.3°, 26.2°, 27.1°, 28.6°, and 29.3° (all +/−0.2°).

Comparative Example 5:
Physical Mixture of Unsubstituted Titanyl Phthalocynine (Dry Milled and Dichloromethane Treated) and Titanyl Fluorophthalocyanine (Dry Milled and Dichloromethane Treated).

A mixture was made by stirring with a tongue depressor 50 percent by weight of the dry product of Comparative Example 3, and 50% by weight of the dry product of Comparative Example 4. An x-ray diffraction spectrum of the mixture (FIG. 8) exhibited major peaks of the Bragg angle 2-theta at 7.5°, 9.3°, 10.2°, 11.6°, 12.6°, 13.2°, 15.0°, 15.9°, 17.2°, 18.3°, 20.7°, 22.4°, 24.1°, 25.3°, 26.2°, 27.1°, 28.5°, and 31.4° (all +/−2°).

The diffraction spectrum is a sum of the diffraction spectra of Comparative Examples 3 and 4.

Example 2:
Dichloromethane Treatment of Dry-Milled Mixture of Titanyl Fluorophthalocyanine and Unsubstituted Titanyl Phthalocyanine: 50/50 Wt/Wt Percent.

Figure 9:
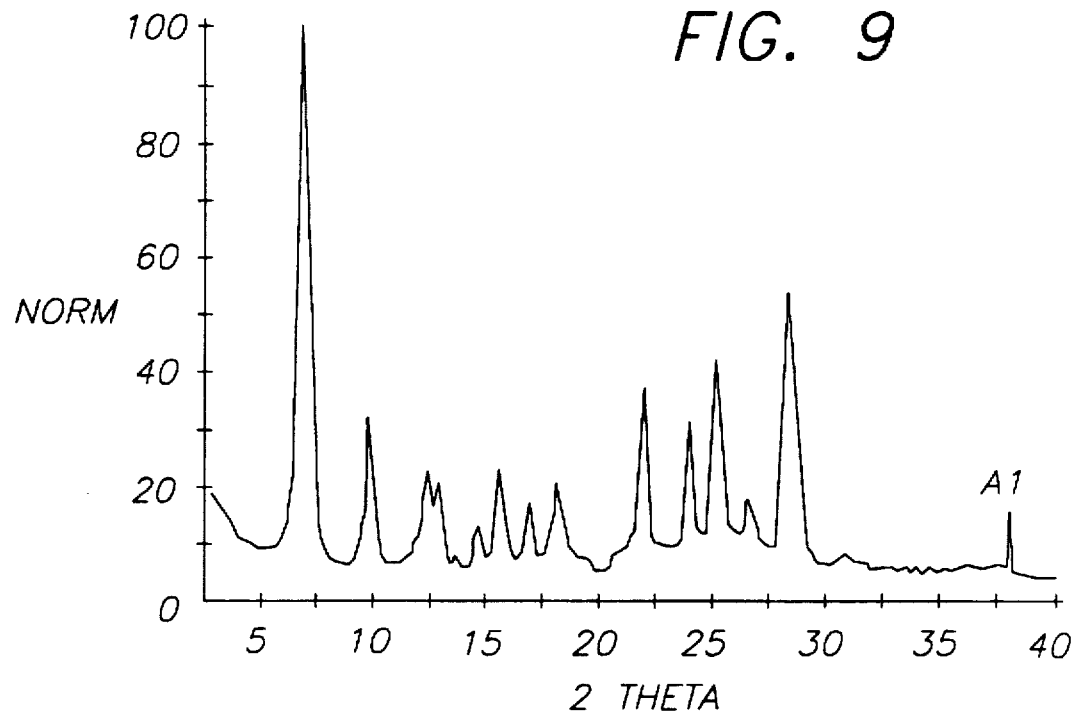
FIG. 9: Example 2.

To approximately 5 grams of the product of Example 1, 200 grams of dichloromethane were added. The mixture was wet milled for 48 hours. Then the beads were separated, and the pigment mixture was filtered, washed with dichloromethane, and dried. The x-ray diffraction spectrum (FIG. 9) exhibited major peaks of the Bragg angle 2-theta at 7.4°, 10.1°, 12.6°, 13.1°, 14.9°, 15.9°, 17.2°, 18.5°, 22.4°, 24.3°, 25.5°, 26.9°, and 28.7° (all +/−0.2°).

The diffraction spectrum of Example 2 is not the sum of the diffraction spectra of Comparative Examples 3 and 4. The diffraction spectrum of Example 2 resembles that of Comparative Example 3, more than it does that of Comparative Example 4. These results support the explanation that the product in Example 2 represents a cocrystallization of the two materials, into a crystal structure somewhat similar to that of Comparative Example 3.

Comparative Examples 6–8:
Electrophotographic Elements.

Electrophotographic elements were prepared using, as a support, a 175 micrometer thick conductive film having a thin layer of nickel deposited on a poly(ethylene terephtalate) substrate. The bare film was first undercoated, using a hopper coating machine, with a barrier layer of a polyamide resin marketed by Toray Chemical Inc. of Japan as Amilan CM8000, (2% weight/weight solution) in ethanol solvent with the hopper coating machine set at an application rate of 0.05 grams(dry)/ft$^2$.

Comparative Examples 6, 7, and 8 used the pigment products of Comparative Examples 3, 4, and 5, respectively. The pigment product (4.08 grams) was mixed with polyester (1.02 grams), 2 mm diameter stainless steel shot (117 grams), and tetrahydrofuran (117 grams) in a 12 ounce jar, and milled in a Sweco Vibro Energy grinding mill for three days. The steel shot was then removed and rinsed with 58.5 grams of dichloromethane, which was added back into the pigment dispersion.

The resulting pigment dispersion was added to a solution of a polyester formed from 4,4'(2-norbornylidene) diphenol and a 40/60 molar ratio of terephthalic/azelaic acids (1.04 grams), 1,1-bis{4-(di-4-tolylamino)phenyl}cyclohexane (0.49 grams), tetrahydrofuran (81.76 grams), and 0.06 grams of a siloxane surfactant sold under the trademark DC-510, by Dow Corning, USA. The resulting dispersion was filtered through an 8 micrometer filter and coated onto the undercoated film using the hopper coating machine operated at 0.05 grams(dry)/ft$^2$ to form a charge generation layer (CGL).

The CGL was overcoated using the hopper coating machine at 2.3 grams(dry)/ft$^2$ with a solution of polyester formed from 4,4'(2-norbornylidene) diphenol and a 40/60 molar ratio of terephtahlic/azelaic acids (10 parts by weight), a polycarbonate sold by the Mobay Company under the trade name Makrolon (40 parts by weight), 1,1-bis{4-(di-4-tolylamino)phenyl}cyclohexane (50 parts by weight), dissolved in dichloromethane (70 parts), and 1,1,2-trichloromethane (30 parts).

The resulting electrophotographic elements were then evaluated as follows. Red and near infrared photosensitivity was determined by electrostatically corona-charging the electrophotographic element to an initial potential of −700 volts and exposing the element to filtered light (narrow band pass) at a wavelength of 775 nm from a xenon flash lamp (160 microsecond flashes), in an amount sufficient to photoconductively discharge the initial potential down to a level of −350 volts. Photosensitivity (also referred to as photographic speed) was measured in terms of the amount of incident actinic radiant energy (expressed in ergs/cm$^2$) needed to discharge the initial voltage down to the desired level of −350 volts. The lower the amount of radiation needed to achieve the desired degree of discharge, the higher is the photosensitivity of the element. Dark decay was determined by letting an unexposed area of the film spontaneously discharge in the dark for seven seconds. The dark decay was calculated by dividing the amount of dark discharge (after seven seconds) by seven. Results appear in Table 2.

Example 3:

Electrophotographic Element.

An electrophotographic element was prepared and evaluated in substantially as in Comparative Examples 6–8, except the pigment used was the product of Example 2. Results appear in Table 2.

TABLE 2

| Example or Comparative Example | Pigment | Speed (ergs/cm$^2$) | Dark decay (volts/sec) |
|---|---|---|---|
| Comparative Example 6 | TiOPc | 3.6 | 4.6 |
| Comparative Example 7 | TiOFPc | 2.5 | 2.9 |
| Comparative Example 8 | physical mixture of TiOPc and TiFOPc | 1.5 | 8 |
| Example 3 | cocrystal | 1.3 | 5 |

Comparative Example 9:

Dry-Milling of 100% Unsubstituted Titanyl Phthalocyanine.

Figure 10:
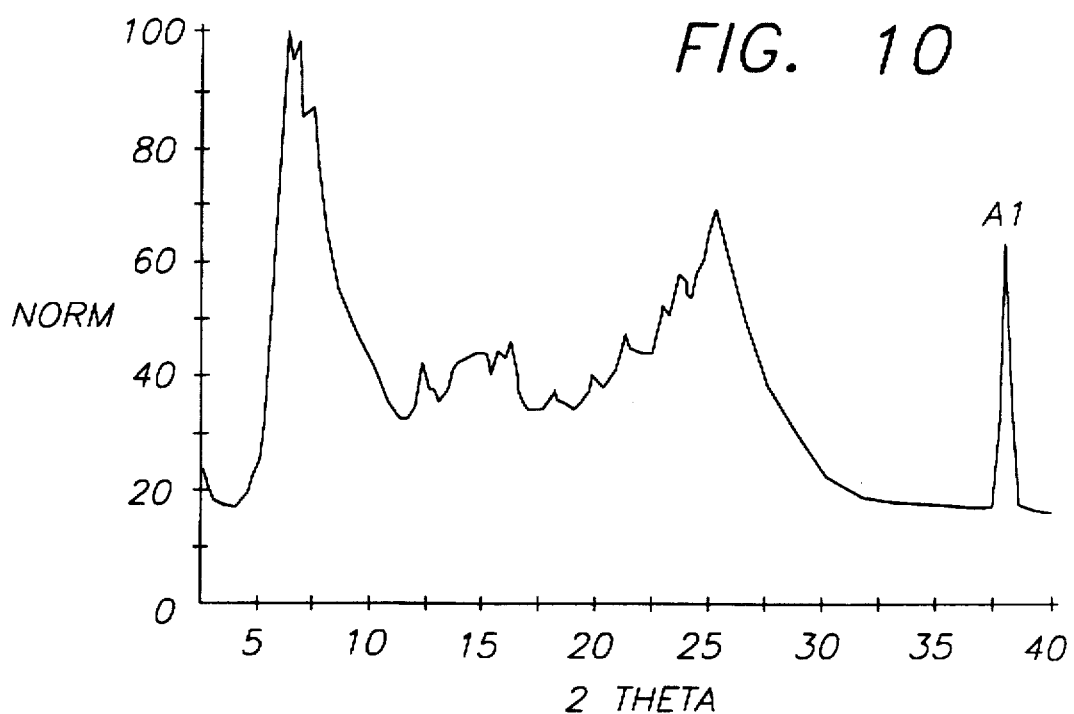
FIG. 10: Comparative Example 9.
Figure 11:
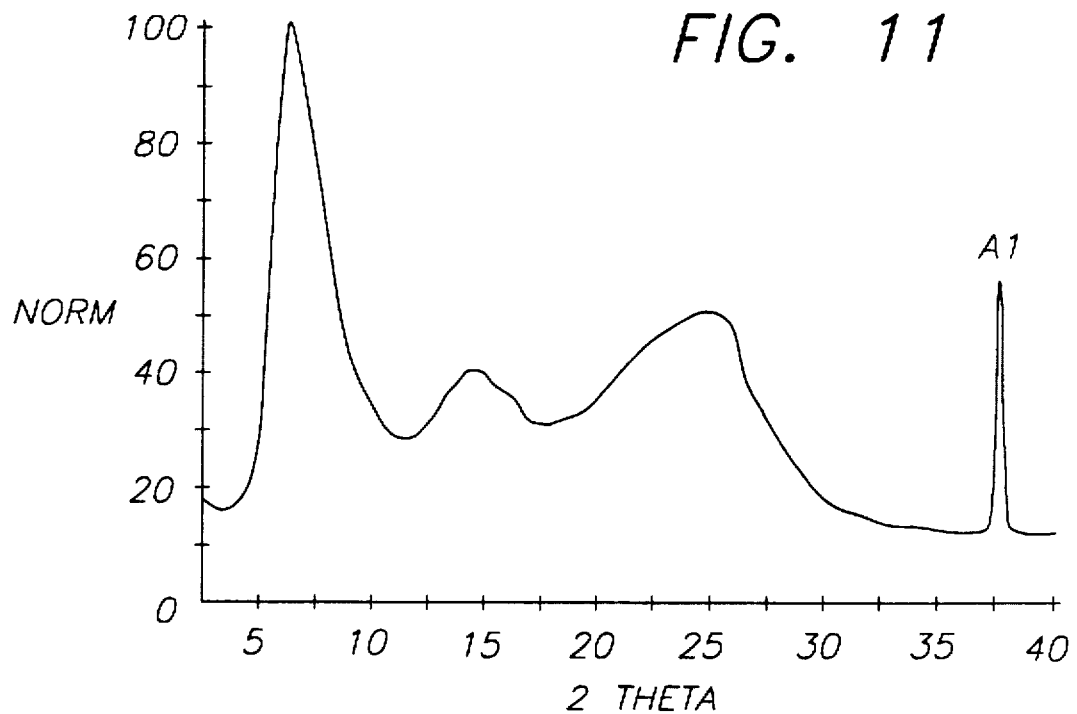
FIG. 11: Example 4.
Figure 12:
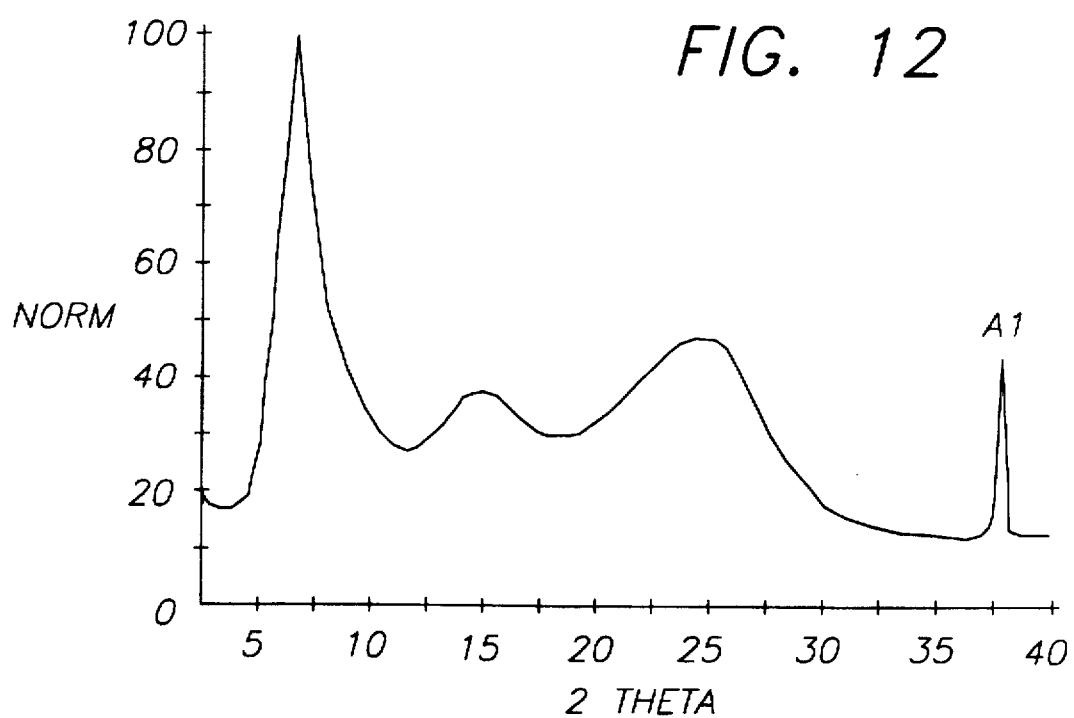
FIG. 12: Example 5.
Figure 13:
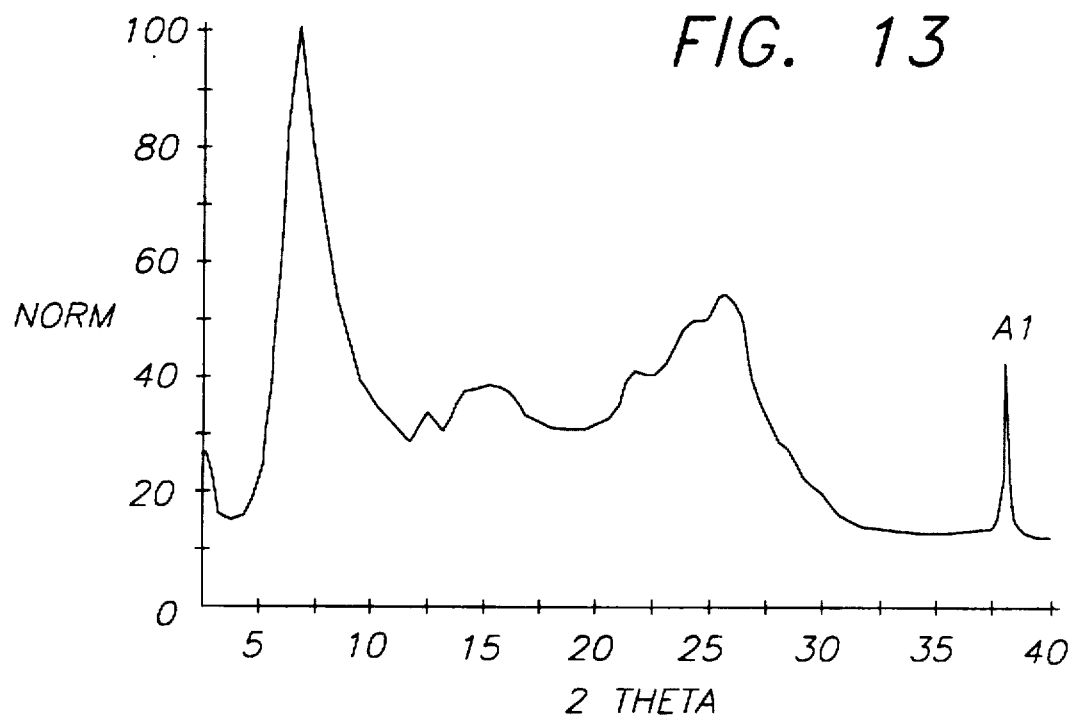
FIG. 13: Example 6.
Figure 14:
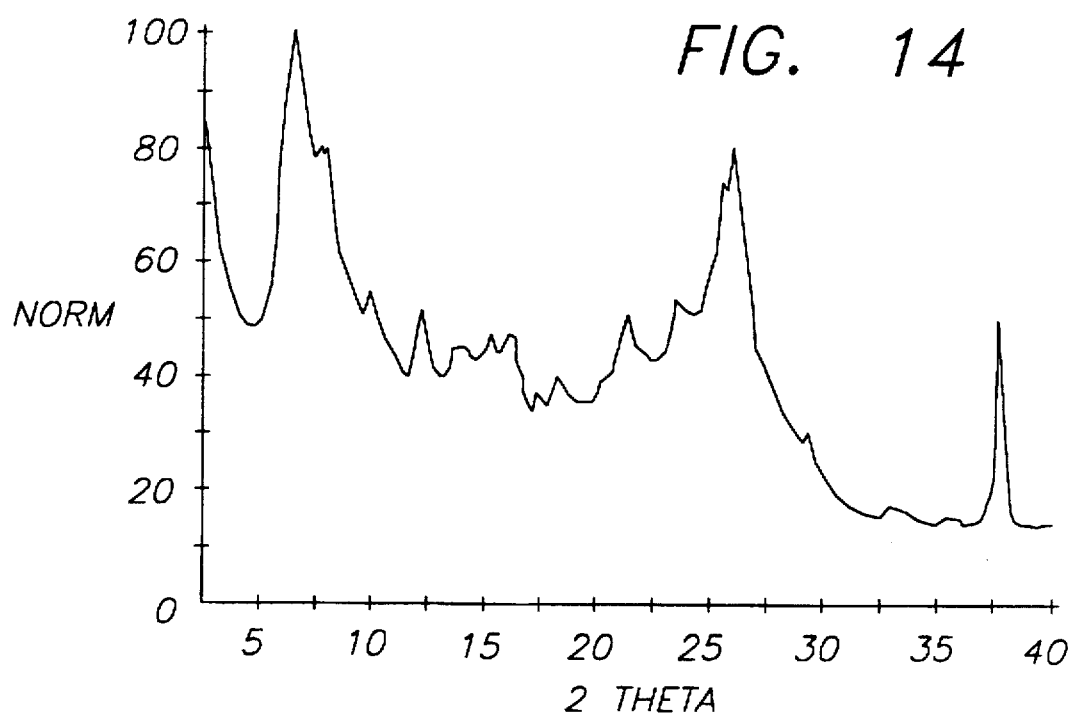
FIG. 14: Example 7.
Figure 15:
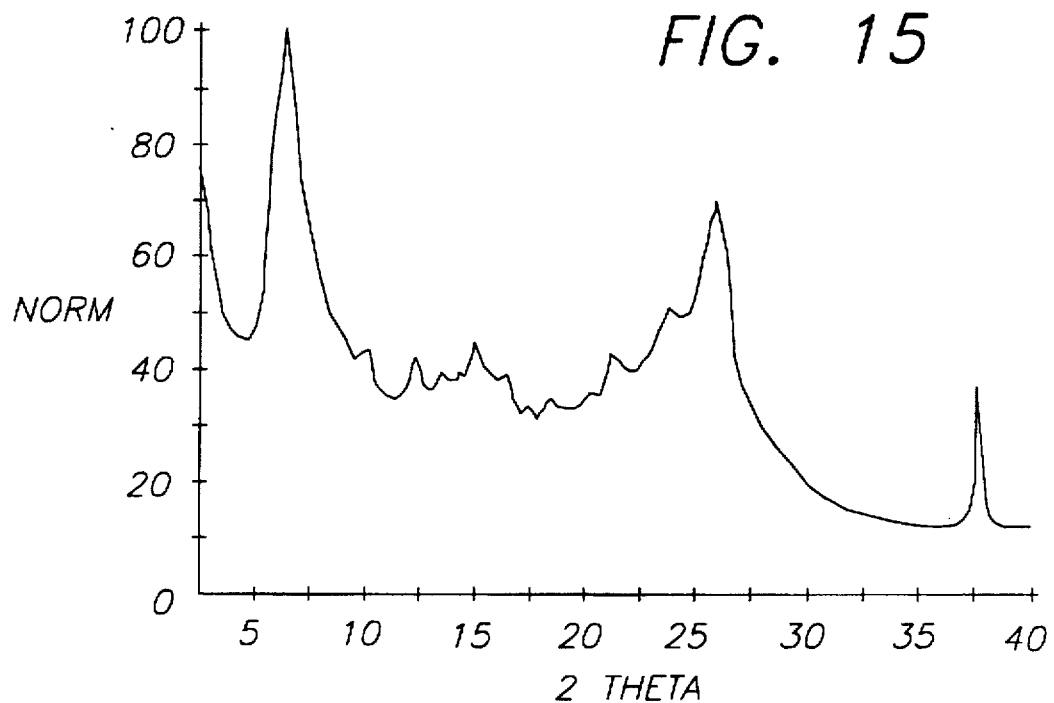
FIG. 15: Example 8.
Figure 16:
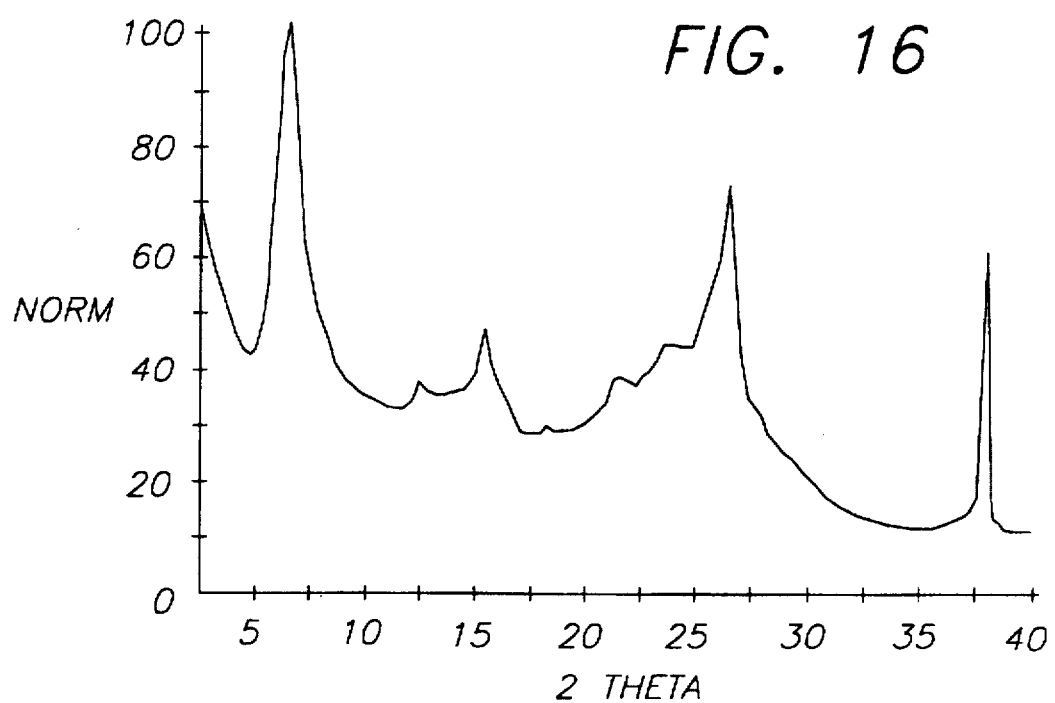
FIG. 16: Example 9.

A 10 gram portion of the crude titanyl phthalocyanine of Preparation 1 was mixed in a 16 ounce jar with 200 grams of 3 mm steel beads. The pigment was then milled using a Sweco Vibro Energy grinding mill for three days. The pigment particles were completely fused, coating the stainless steel beads, and agglomerating at the bottom of the jar in one big mass. The mass was broken down, and samples taken for x-ray diffraction analysis. The x-ray diffraction spectrum (FIG. 10) exhibits major peaks of the Bragg angle 2-theta at 7.3°, 8.4°, 10.3°, 12.2°, 14.5°, 16.8°, 19.1°, 22.0°, 24.5°, and 26.2° (all +/−0.2°).

The diffractogram was somewhat broad, but the presence of material with high crystallinity is indicated by peaks showing some definition.

Examples 4–9:

Dry-Milling of Mixtures of Unsubstituted Titanyl Phthalocyanine and Titanyl Fluorophthalocyanine.

The procedures of Comparative Example 9 were followed except that mixture of unsubstituted titanyl phthalocyanine and titanyl fluorophthalocyanine were used as pigment, as indicated in Table 3. The x-ray diffraction spectra of the dry-milled materials (FIGS. 11–16) exhibited major peaks of the Bragg angle 2-theta as indicated in Table 3.

The crystallograms of Examples 4–9 are characteristic of very noncrystalline mixtures, i.e., fully amorphous pigment mixtures.

Comparative Example 10:

Dry-Milling of 100% Titanyl Fluorophthalocyanine.

Figure 17:
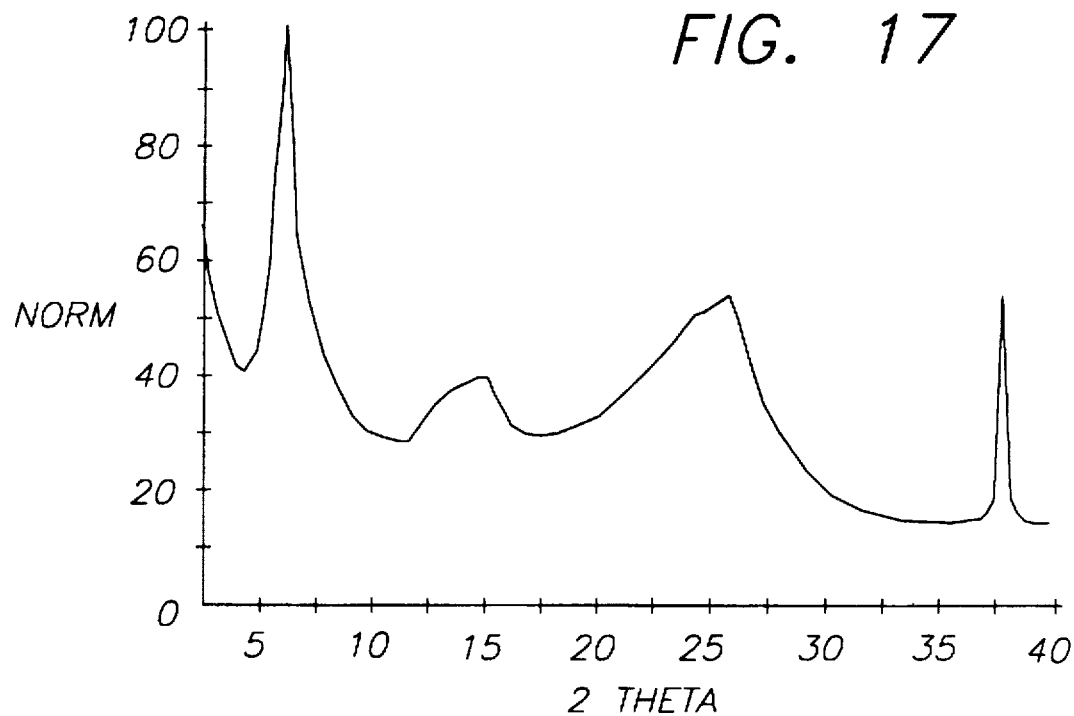
FIG. 17: Comparative Example 10.

The procedures of Comparative Example 9 were followed except that titanyl fluorophthalocyanine was used as pigment, as indicated in Table 3. The x-ray diffraction spectra of the dry-milled materials (FIG. 17) exhibited major peaks of the Bragg angle 2-theta as indicated in Table 3.

TABLE 3

| Ex. or Comp. Ex. | TiOPc: TiFOPc | Treatment | x-ray peaks (Bragg angle 2θ degrees +/− 0.2°) |
|---|---|---|---|
| Comp. Ex. 9 | 100:0 | dry milled | 7.3, 8.4, 10.3, 12.2, 14.5, 16.8, 19.1, 22.0, 24.5, 26.2 |
| Ex. 4 | 95:5 | dry milled | 7.2, 15.0, 25.7 |
| Ex. 5 | 90:10 | dry milled | 7.2, 15.3, 25.7 |
| Ex. 6 | 85:15 | dry milled | 7.2, 15.3, 22.1, 26.2 |
| Ex. 7 | 75:25 | dry milled | 7.0 8.2 9.3 10.6 12.7, 14.2, 15.1, 15.8, 16.8, 18.0, 18.9, 21.9, 24.4, 26.2, 26.7, 33.7 |
| Ex. 8 | 50:50 | dry milled | 7.0, 10.5 12.9, 15.8, 16.8, 19.2, 22.1, 24.5, 26.2, 26.8 |
| Ex. 9 | 25:75 | dry milled | 6.9, 12.8, 15.8, 22.1, 26.9 |
| Comp. Ex. 10 | 0:100 | dry milled | 6.9, 15.9, 26.7 |

Comparative Example 11:
Dichloromethane Treatment of Dry-Milled 100% Unsubstituted Titanyl Phthalocyanine.

Figure 18:
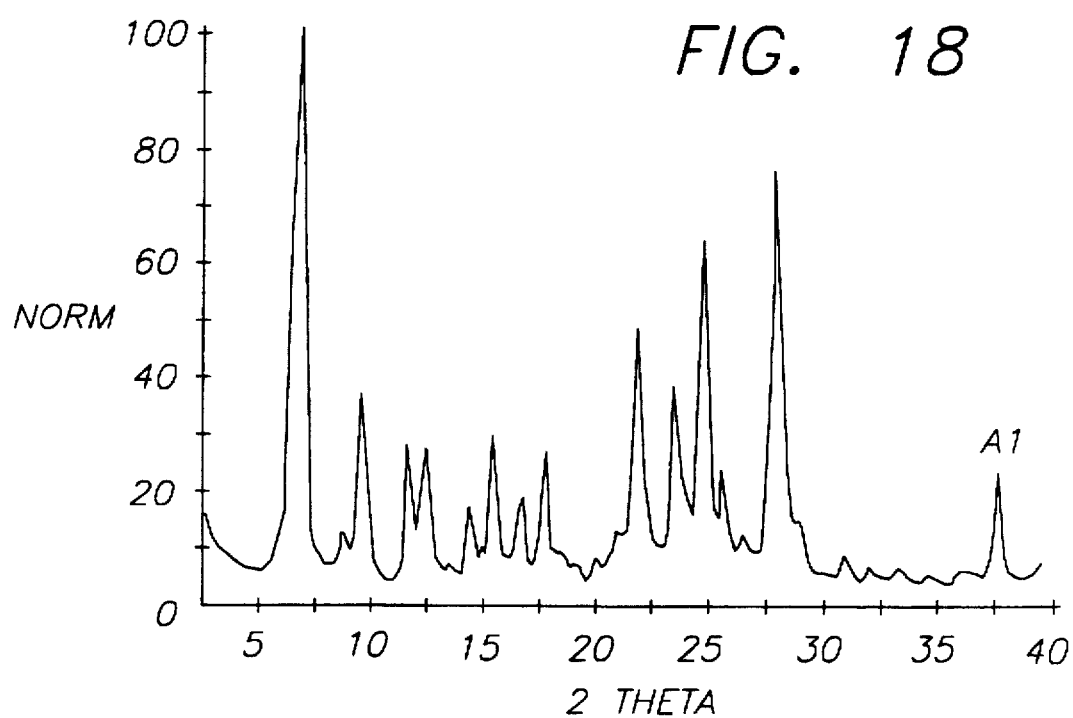
FIG. 18: Comparative Example 11.
Figure 19:
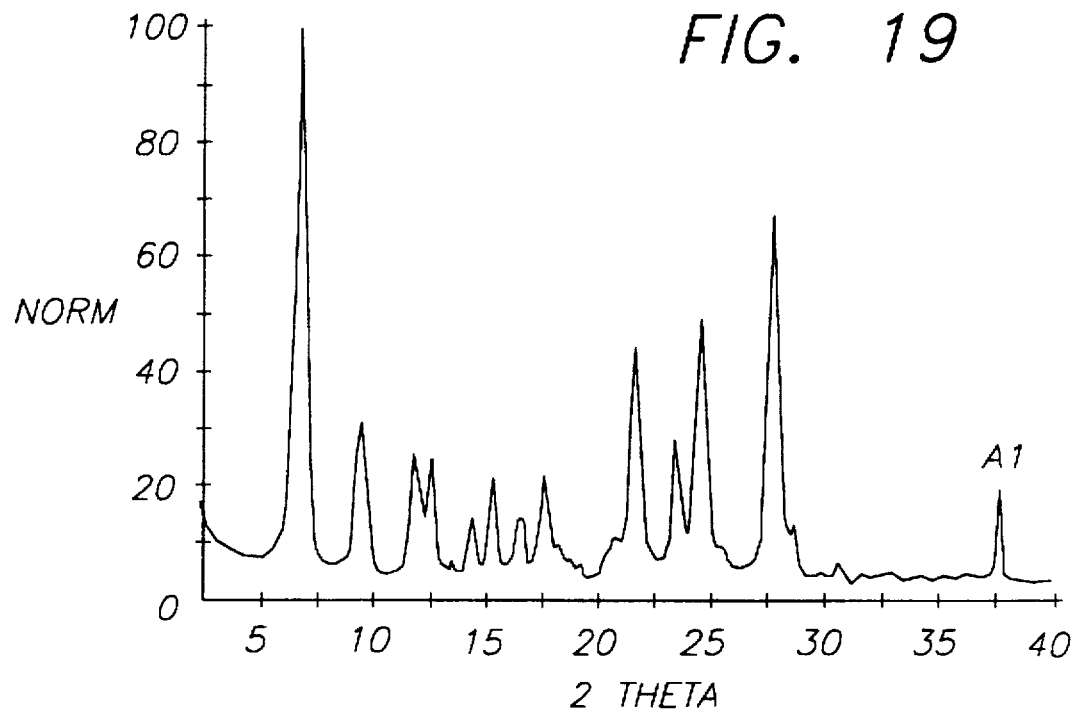
FIG. 19: Example 10.
Figure 20:
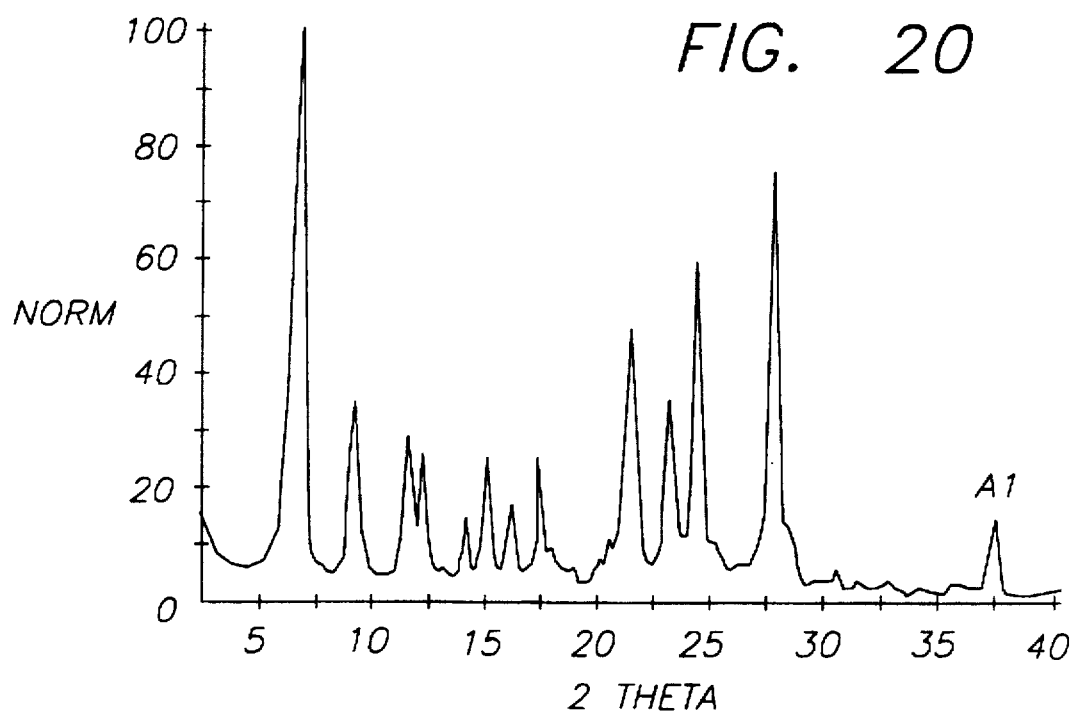
FIG. 20: Example 11.
Figure 21:
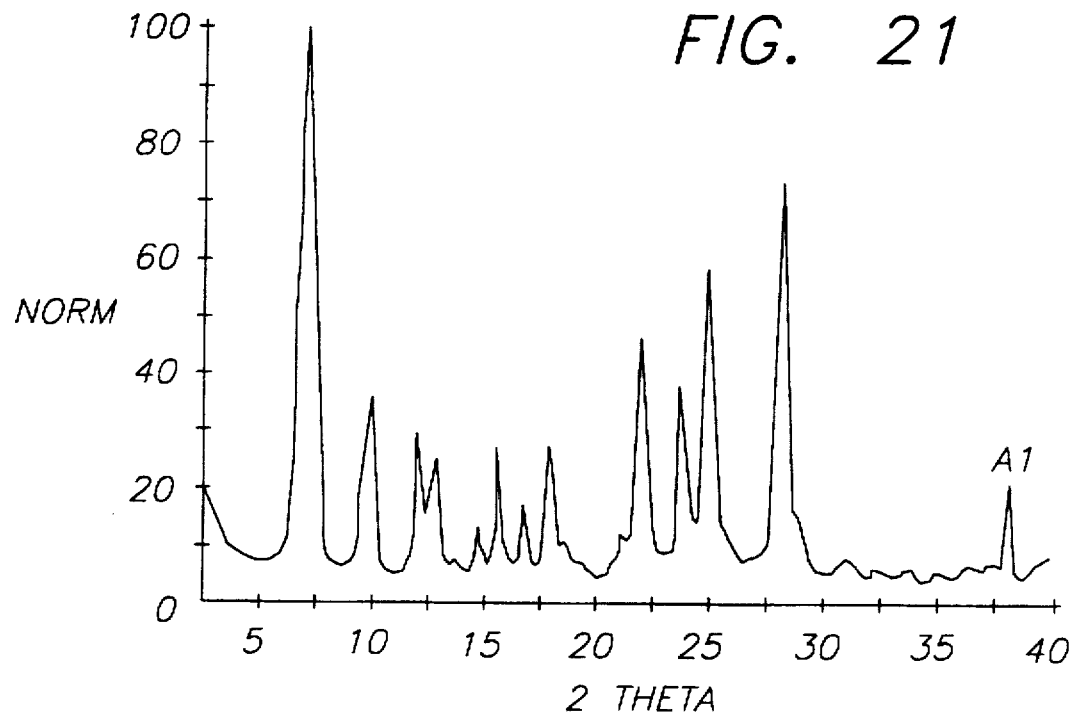
FIG. 21: Example 12.
Figure 22:
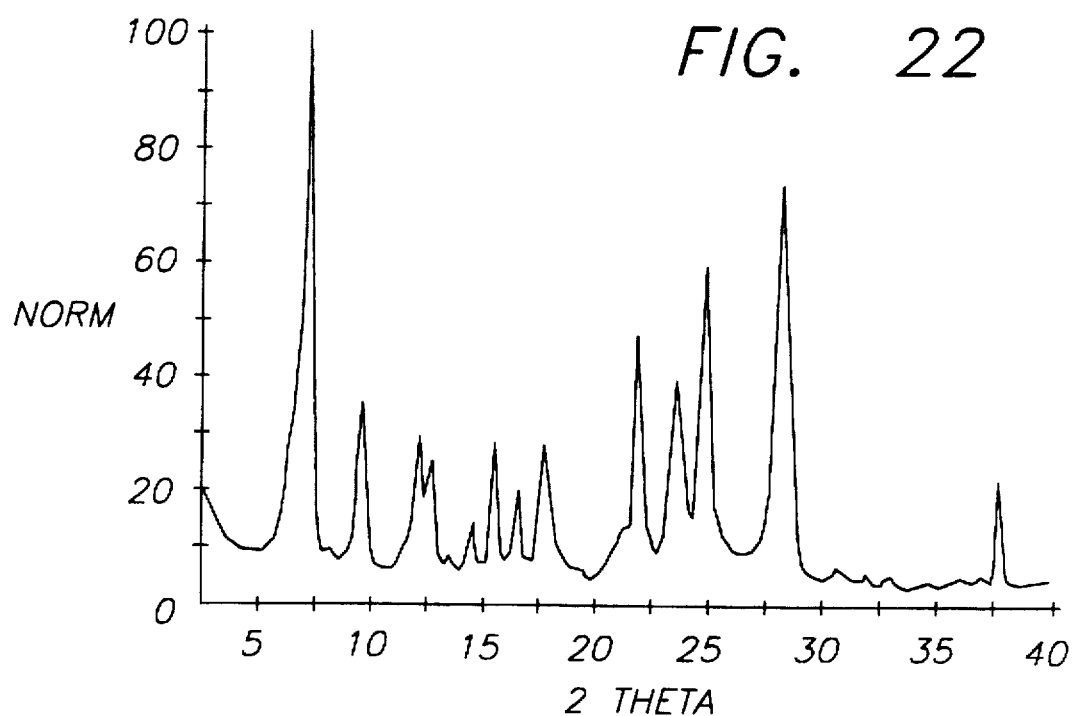
FIG. 22: Example 13.
Figure 23:
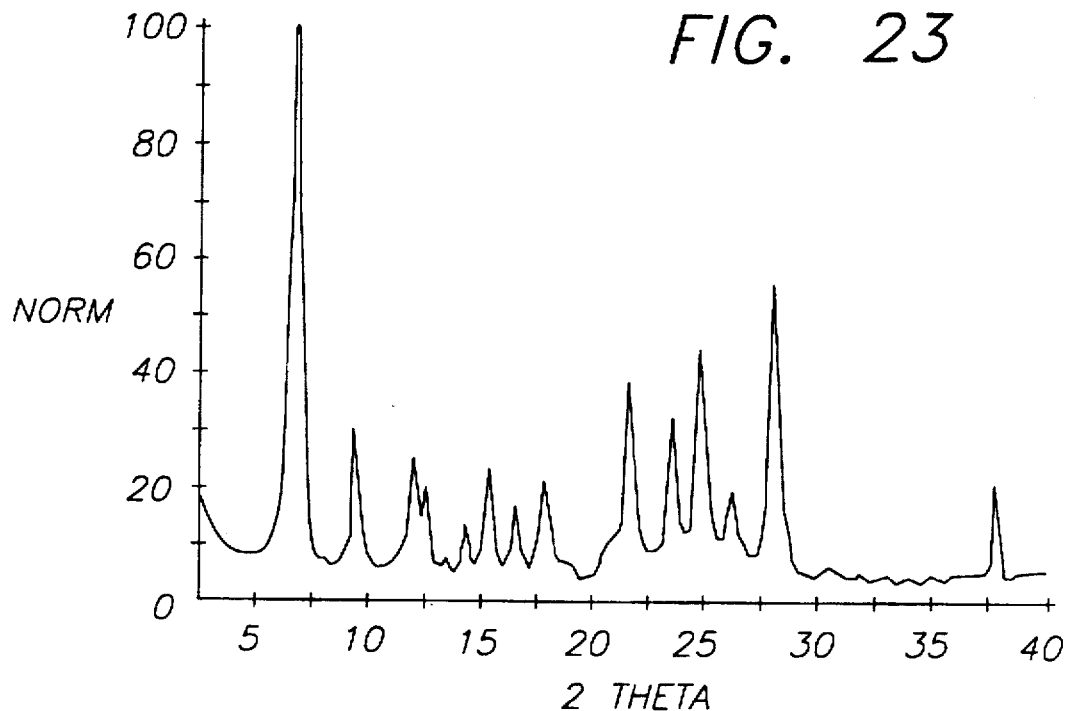
FIG. 23: Example 14.
Figure 24:
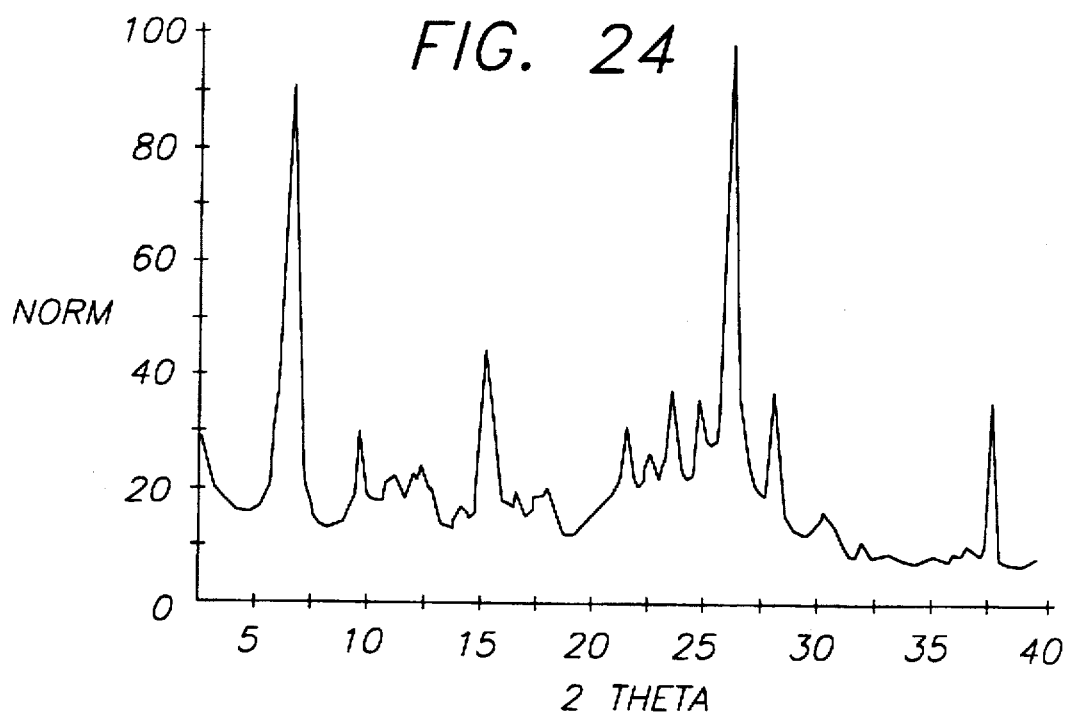
FIG. 24: Example 15.
Figure 27:
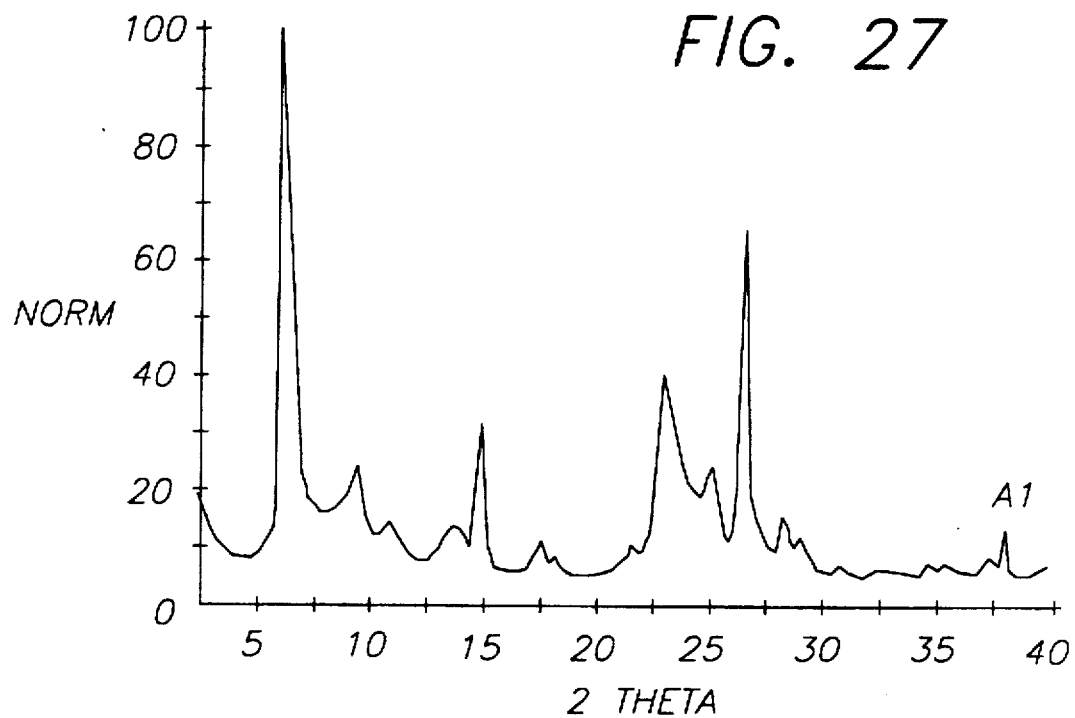
FIG. 27: Comparative Example 19.
Figure 28:
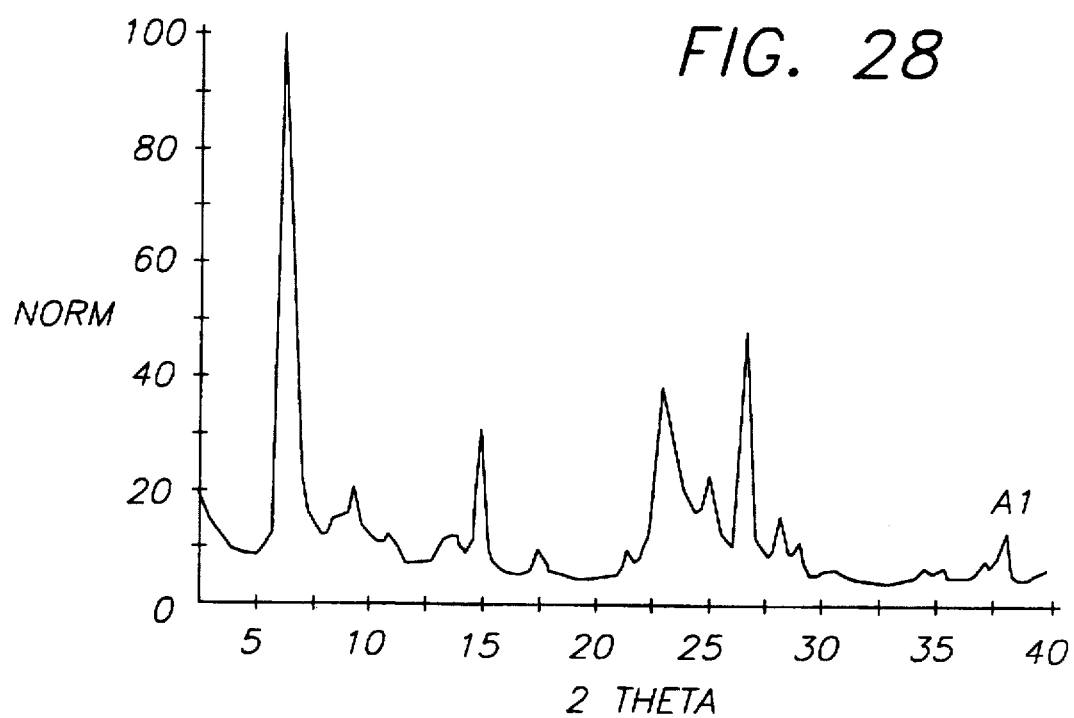
FIG. 28: Comparative Example 20.
Figure 29:
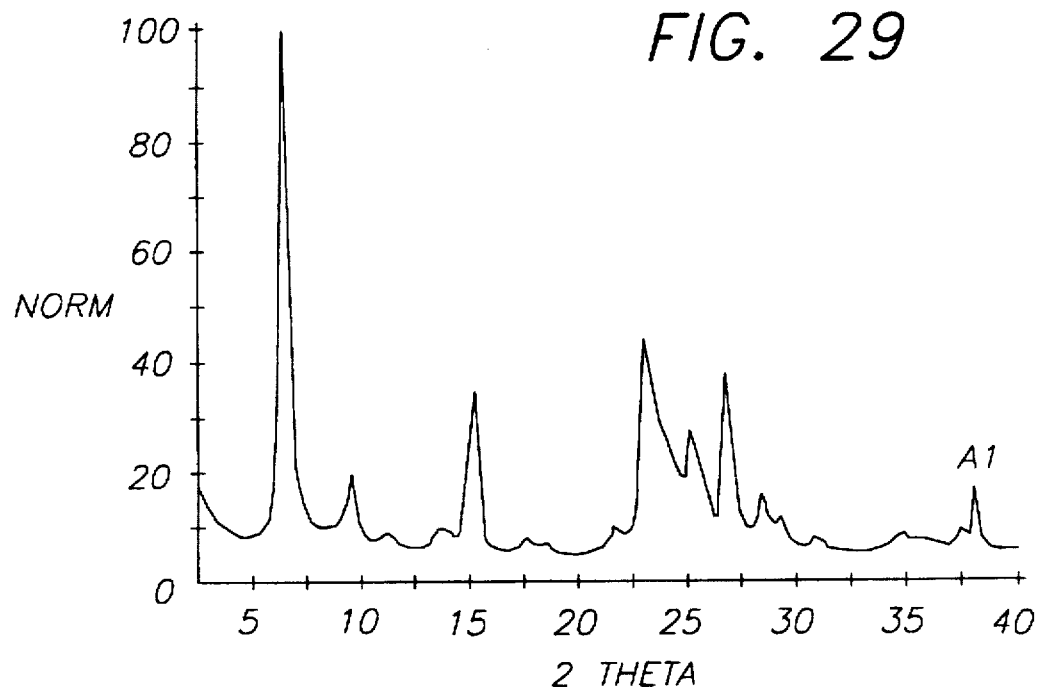
FIG. 29: Comparative Example 21.
Figure 30:
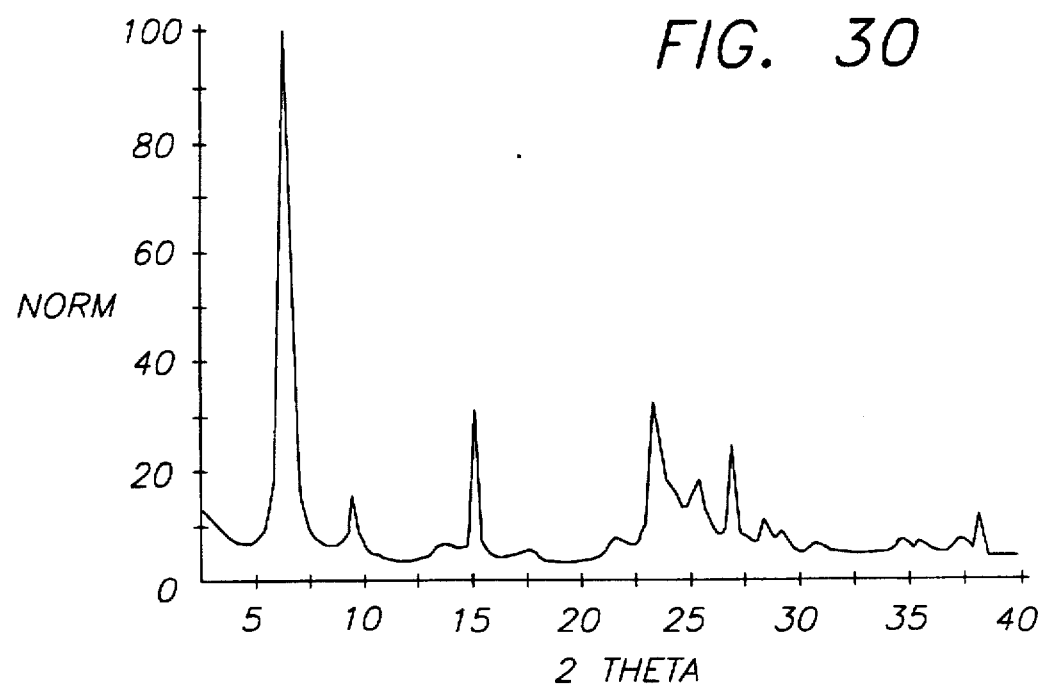
FIG. 30: Comparative Example 22.
Figure 31:
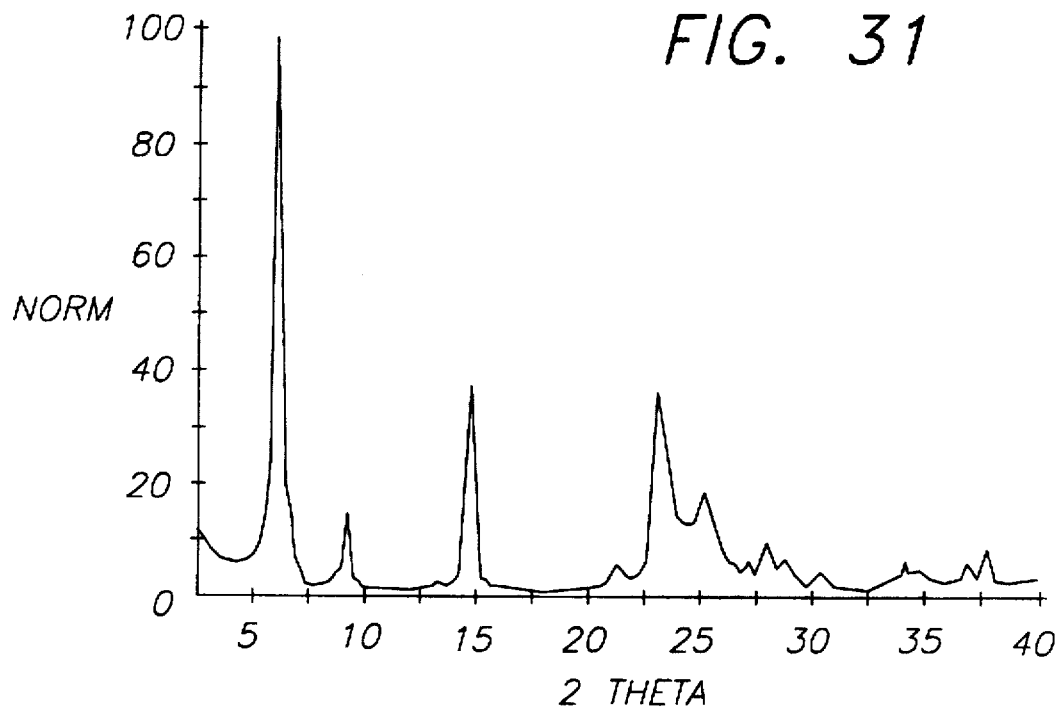
FIG. 31: Comparative Example 23.
Figure 32:
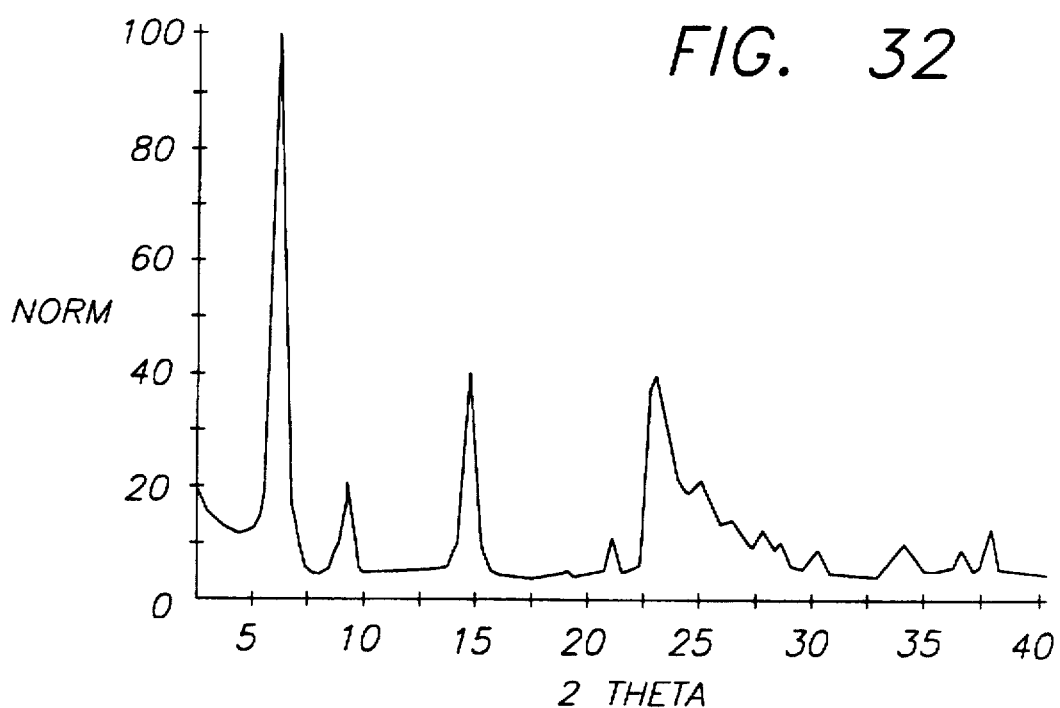
FIG. 32: Comparative Example 24.

An approximately 5 gram portion of the dry-milled product of Comparative Example 9 was mixed with 200 grams of dichloromethane and wet milled for 48 hours. Then the beads were separated, and the pigment was filtered, washed with dichloromethane, and dried. The x-ray diffraction spectrum (FIG. 18) exhibits major peaks of the Bragg angle 2-theta at 7.6°, 9.3°, 10.3°, 12.6°, 13.2°, 15.1°, 16.2°, 17.3°, 18.4°, 22.6°, 24.2°, 25.4°, 26.2°, 28.6°, and 29.4° (all +/−0.2°).

Electrophotographic elements were prepared as substantially as described in Comparative Examples 6–8, except using the pigment of this comparative example and having charge generation layer thicknesses of 1 micrometer and 0.5 micrometers. Results are reported in Tables 5 (one micrometer element) and Table 6 (0.5 micrometer element).

Examples 10–15:
Dichloromethane Treatment of Dry-Milled Mixtures of Unsubstituted Titanyl Phthalocyanine and Titanyl Fluorophthalocyanine.

The procedures of Comparative Example 11 were followed except that the dry milled pigment mixtures prepared in Examples 4–9, respectively, were used as pigment. After the dichloromethane treatment, the x-ray diffraction spectra of the pigment mixtures (FIGS. 19–24) exhibited major peaks of the Bragg angle 2-theta as indicated in Table 4. Electrophotographic elements exhibited the results reported in Tables 5–6.

Comparative Example 12:
Dichloromethane Treatment of Titanyl Fluorophthalocyanine.

The procedures of Comparative Example 11 were followed except that titanyl fluorophthalocyanine was used as pigment. After the dichloromethane treatment, the x-ray diffraction spectrum of the pigment (FIG. 25) exhibited major peaks of the Bragg angle 2-theta as indicated in Table 4. Electrophotographic element results are reported in Tables 5–6.

Comparative Examples 13–17:
Physical Mixtures of Unsubstituted Titanyl Phthalocyanine (Dry Milled and Dichloro Methane Treated) and Titanyl Fluorophthalocyanine (Dry Milled and Dichloromethane Treated).

The procedures of Comparative Examples 11 and 12 were followed to prepare crystalline unsubstituted titanyl phthalocyanine and crystalline titanyl fluorophthalocyanine. The two pigments were then combined to provide the mixed particulates indicated in Table 7. Electrophotographic elements were prepared substantially as described in Comparative Examples 11–12. Results are reported in Table 7.

TABLE 4

| Ex. or Comp. Ex. | TiOPc: TiFOPc | Treatment | x-ray peaks (Bragg angle 2θ degrees +/− 0.2°) |
|---|---|---|---|
| Comp. Ex. 11 | 100:0 | 1) dry milled | 7.6, 9.3, 10.3, 12.6, 13.2, 15.1 |
| | | 2) DCM | 16.2, 17.3, 18.4, 22.6, 24.2, 25.4, 26.2, 28.6, 29.4 |
| Ex. 10 | 95:5 | 1) dry milled | 7.5, 10.2, 12.6, 13.2, 15.1, 16.1, 17.2, |
| | | 2) DCM | 18.4, 21.7, 22.4, 24.2, 25.3, 28.6, 29.2 |
| Ex. 11 | 90:10 | 1) dry milled | 7.5, 10.2, 12.6, 13.2, 15.1, 16.1, 17.2, |
| | | 2) DCM | 18.4, 21.7, 22.5, 24.2, 25.4, 28.7, 31.5 |
| Ex. 12 | 85:15 | 1) dry milled | 7.5, 10.2, 12.6, 13.2, 15.1, 16.1, 17.2, |
| | | 2) DCM | 18.4, 21.7, 22.4, 24.2, 25.3, 28.6 |
| Ex. 13 | 75:25 | 1) dry milled | 7.5, 10.2, 12.7, 13.2, 15.1, 16.1, 17.2, |
| | | 2) DCM | 18.5, 22.4, 24.2, 25.3, 28.7 |
| Ex. 14 | 50:50 | 1) dry milled | 7.3, 10.1, 12.6, 13.1, 14.9, 15.9, 17.2, |
| | | 2) DCM | 18.4, 22.4, 24.3, 25.5, 26.9, 28.7 |
| Ex. 15 | 25:75 | 1) dry milled | 7.3, 10.1, 11.7, 13.0, 14.8, 15.9, 17.3, |
| | | 2) DCM | 18.2, 18.6, 22.3, 24.4, 25.6, 27.0, 28.8, 31.0 |
| Comp. Ex. 12 | 0:100 | 1) dry milled | 7.3, 10.1, 11.7, 12.9, 15.8, 18.2, 22.2, |
| | | 2) DCM | 23.2, 24.4, 27.1, 31.3 |

TABLE 5

| Example or Comparative Example | CGL thickness (microns) | Speed (ergs/cm²) | Dark decay (volts/sec) |
|---|---|---|---|
| Comparative Example 11 | 1 | 2.5 | 12.1 |
| Example 10 | 1 | 2 | 5.7 |
| Example 11 | 1 | 1.5 | 8.6 |
| Example 12 | 1 | 1.2 | 12.1 |
| Example 13 | 1 | 1 | 12.6 |
| Example 14 | 1 | 1.4 | 12.9 |
| Example 15 | 1 | 1.3 | 15.3 |
| Comparative Example 12 | 1 | 2.5 | 2.9 |

TABLE 6

| Example or Comparative Example | CGL thickness (microns) | Speed (ergs/cm²) | Dark decay (volts/sec) |
|---|---|---|---|
| Comparative Example 11 | 0.5 | 3 | 7.1 |
| Example 10 | 0.5 | 2 | 5 |
| Example 11 | 0.5 | 1.9 | 5 |
| Example 12 | 0.5 | 1.4 | 7.1 |
| Example 13 | 0.5 | — | — |
| Example 14 | 0.5 | 1.6 | 6.9 |
| Example 15 | 0.5 | — | — |
| Comparative Example 12 | 0.5 | — | — |

TABLE 7

| Example or Comparative Example | CGL thickness (microns) | Speed (ergs/cm$^2$) | Dark decay (volts/sec) | TiOPc: TiFOPc |
|---|---|---|---|---|
| Comparative Example 13 | 1 | 2.5 | 18.6 | 100:1 |
| Comparative Example 14 | 1 | 1.2 | 22.9 | 75:25 |
| Comparative Example 15 | 1 | 1.4 | 18.6 | 50:50 |
| Comparative Example 16 | 1 | 1.6 | 15 | 25:75 |
| Comparative Example 17 | 1 | 4.5 | 4.3 | 0:100 |

Comparative Examples 18–25:

Methanol Treatment of Dry-Milled 100% Unsubstituted Titanyl Phthalocyanine, Dry-Milled Mixtures of Unsubstituted Titanyl Phthalocyanine and Titanyl Fluorophthalocyanine, and Dry-Milled 100% Titanyl Fluorophthalocyanine.

For each of the materials produced in Comparative Example 9, Examples 4–9, and Comparative Example 10, respectively; an approximately 5 gram portion of dry-milled pigment or pigment mixture was mixed with 200 grams of methanol and wet milled for 48 hours. Then the beads were separated, and the pigment was filtered, washed with methanol, and dried. The x-ray diffraction spectra (FIGS. 26–32) exhibited major peaks of the Bragg angle 2-theta as indicated in Table 8. Electrophotographic elements were prepared as described in Comparative Examples 11–12 and Examples 10–15, except only elements having 1 micrometer thick charge generation layers were prepared. Results are reported in Table 9.

TABLE 8

| Example or Comp. Ex. | TiOPc: TiFOPc | Treatment | x-ray peaks (Bragg angle 2θ degrees +/− 0.2°) |
|---|---|---|---|
| Comp. Ex. 18 | 100:0 | 1) dry milled 2) MeOH | 6.9, 7.4, 9.3, 11.5, 13.8, 14.2, 17.9, 23.8, 25.4, 27.3, 28.8 |
| Comp. Ex. 19 | 95:5 | 1) dry milled 2) MeOH | 6.9, 9.7, 15.4, 17.9, 23.5, 25.6, 27.2, 28.7 |
| Comp. Ex. 20 | 90:10 | 1) dry milled 2) MeOH | 6.8, 9.6, 13.9, 15.4, 23.6, 25.6, 27.2, 28.7 |
| Comp. Ex. 21 | 85:15 | 1) dry milled 2) MeOH | 6.9, 9.7, 13.9, 15.5, 23.6, 25.6, 27.2, 28.7, 29.5 |
| Comp. Ex. 22 | 75:25 | 1) dry milled 2) MeOH | 6.9, 9.7, 15.4, 23.6, 25.6, 27.2. |
| Comp. Ex. 23 | 50:50 | 1) dry milled 2) MeOH | 6.9, 9.7, 15.4, 23.6, 25.6, 27.2. |
| Comp. Ex. 24 | 25:75 | 1) dry milled 2) MeOH | 6.8, 9,7, 15.3, 23.7, 25.6, 27.0, 28.3. |
| Comp. Ex. 25 | 0:100 | 1) dry milled 2) MeOH | 6.8, 9,6, 15.1, 23.7, 25.7, 27.1, 28.1, 34.2. |

TABLE 9

| Comparative Example | CGL thickness (microns) | Speed (ergs/cm$^2$) | Dark decay (volts/sec) |
|---|---|---|---|
| Comparative Example 18 | 1 | Could not be measured | 43 |
| Comparative Example 19 | 1 | Could not be measured | 46.4 |
| Comparative Example 20 | 1 | Could not be measured | 39.3 |
| Comparative Example 21 | 1 | Could not be measured | 54.3 |
| Comparative Example 22 | 1 | Could not be measured | 54 |
| Comparative Example 23 | 1 | Could not be measured | 46.4 |
| Comparative Example 24 | 1 | 33.1 | 17.9 |
| Comparative Example 25 | 1 | 33.1 | 5 |

Examples 16–18:

Treatment of Dry-Milled Mixture of 75 wt. % Unsubstituted Titanyl Phthalocyanine and 25 wt. % Titanyl Fluorophthalocyanine with Different Solvents.

Figure 33:
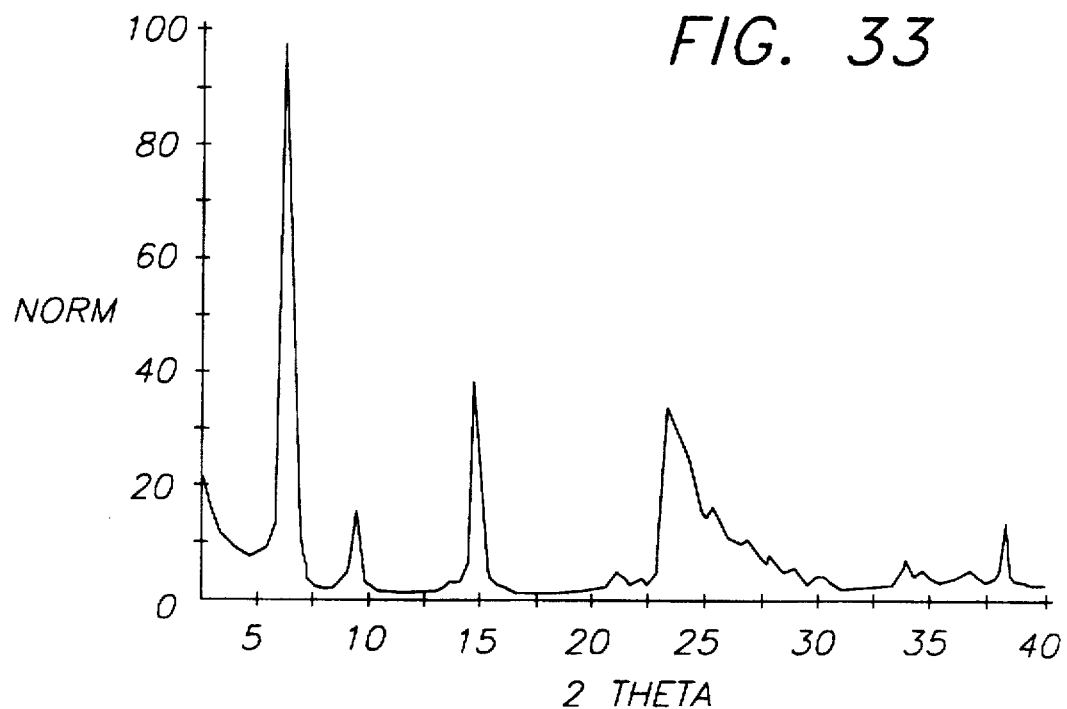
FIG. 33: Comparative Example 25.
Figure 34:
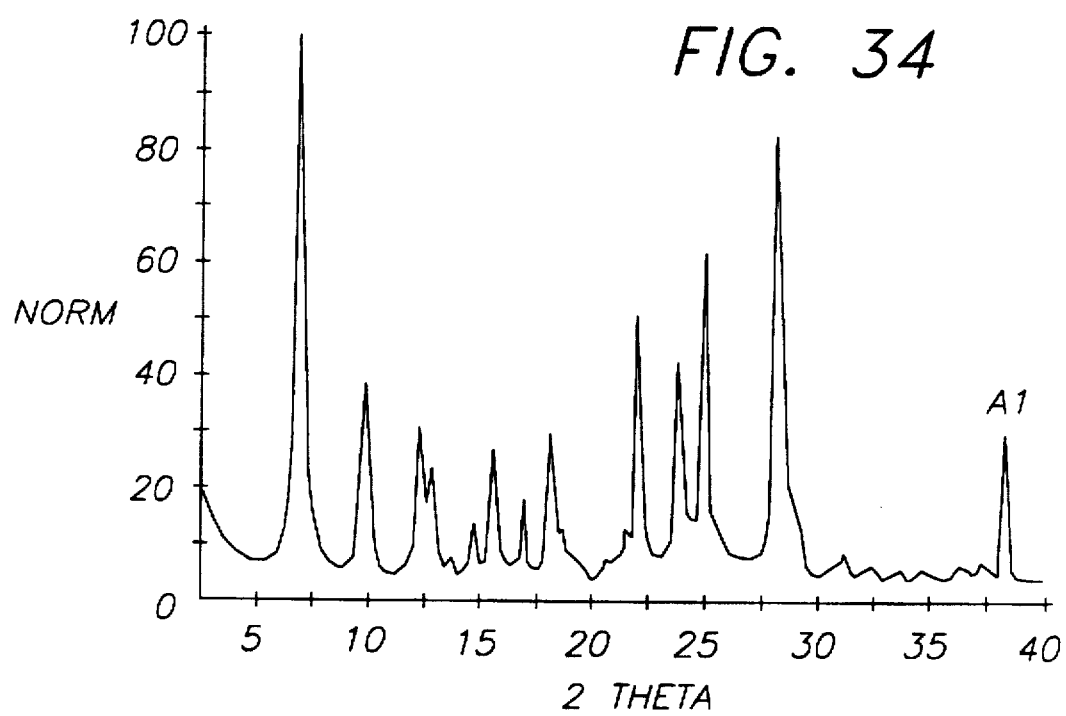
FIG. 34: Example 16.
Figure 35:
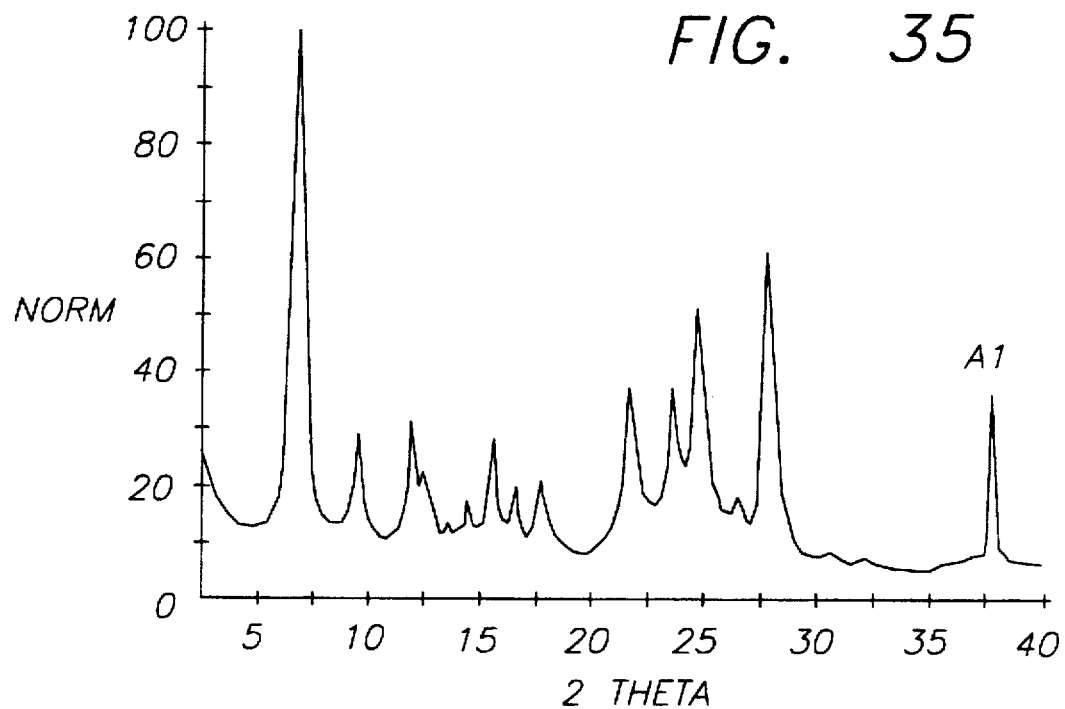
FIG. 35: Example 17.

The procedures of Example 13 were repeated except different treating solvents were used as indicated in Table 10. The x-ray diffraction spectra (FIGS. 33–35) exhibited major peaks of the Bragg angle 2-theta as indicated in Table 10.

Comparative Examples 26–28:

Treatment of Dry-Milled Mixture of 75 wt. % Unsubstituted Titanyl Phthalocyanine and 25 wt. % Titanyl Fluorophthalocyanine with Different Solvents.

Figure 36:
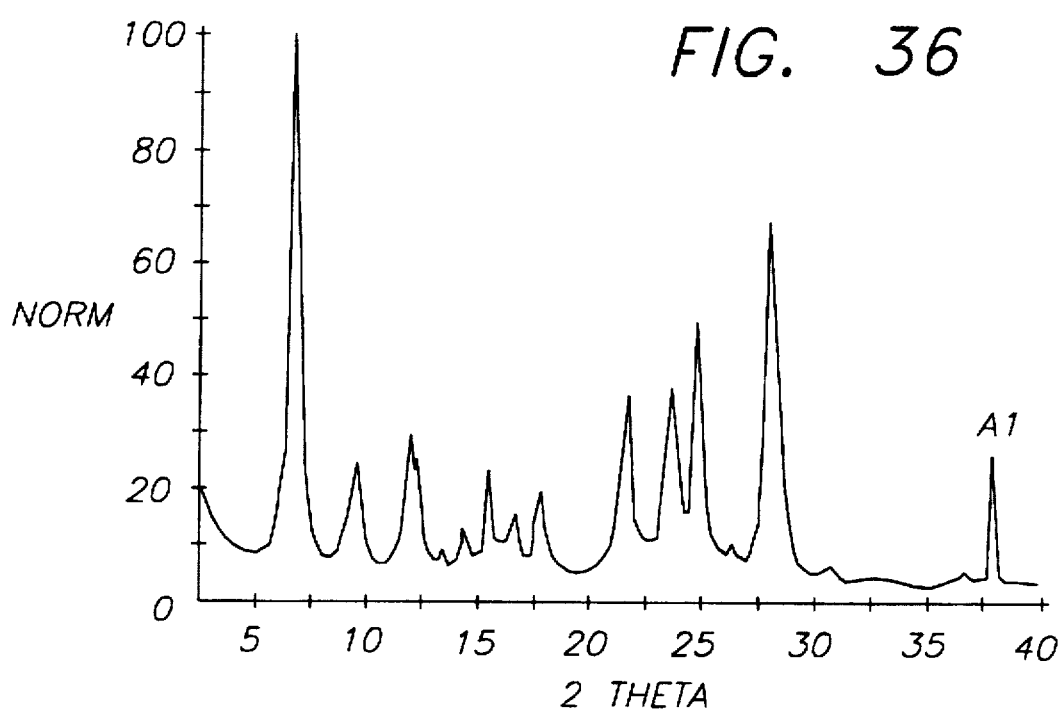
FIG. 36: Example 18.

The procedures of Example 13 were repeated except different treating solvents were used as indicated in Table 10. The x-ray diffraction spectra (FIGS. 36–38) exhibited major peaks of the Bragg angle 2-theta as indicated in Table 10.

The diffraction spectra of Comparative Examples 26–28 exhibit peaks consonant with a mixture of crystal type of differing morphology.

TABLE 10

| Example or Comp. Ex. | TiOPc: TiFOPc | Treatment | x-ray peaks (Bragg angle 2θ degrees +/− 0.2°) |
|---|---|---|---|
| Example 16 | 75:25 | 1) dry milled 2) DCM ($gamma_c = 1.5$) | 7.5, 10.2, 12.6, 13.2, 15.0, 16.1, 17.2, 18.4, 19.0, 22.4, 24.2, 25.4, 28.7 |
| Example 17 | 75:25 | 1) dry milled 2) toluene ($gamma_c = 4.5$) | 7.4, 10.1, 12.6, 13.1, 14.9, 16.1, 17.2, 18.4, 22.3, 24.2, 25.4, 28.6 |
| Example 18 | 75:25 | 1) dry milled 2) methyl ethyl ketone ($gamma_c = 7.7$) | 7.4, 10.1, 12.6, 13.2, 15.0, 16.1, 17.2, 18.4, 22.4, 24.2 25.4, 28.6 |
| Comp. Ex. 26 | 75:25 | 1) dry milled 2) acetone ($gamma_c = 9.7$) | 6.8, 7.5, 9.7, 10.2, 12.7, 13.2, 15.3, 16.2, 17.2, 18.4, 22.5, 23.9, 24.3, 25.5, 28.7 |
| Comp. Ex. 27 | 75:25 | 1) dry milled 2) tetrahydrofuran ($gamma_c = 9.7$) | 7.5, 10.2, 12.7, 13.2, 15.0, 16.1, 17.2, 18.4, 18.9, 22.4, 24.3, 25.5, 27.1, 28.7 |
| Comp. Ex. 28 | 75:25 | 1) dry milled 2) methanol ($gamma_c = 18.7$) | 6.9, 7.5, 9.8, 15.5, 21.9, 23.7, 24.3, 25.6, 27.3, 28.7, 29.5 |

Example 29:

Treatment of Dry-Milled Mixture of 75 wt. % Unsubstituted Titanyl Phthalocyanine and 25 wt. % Titanyl Fluorophthalocyanine with Water, a Non-Crystallizing Solvent.

Figure 40:
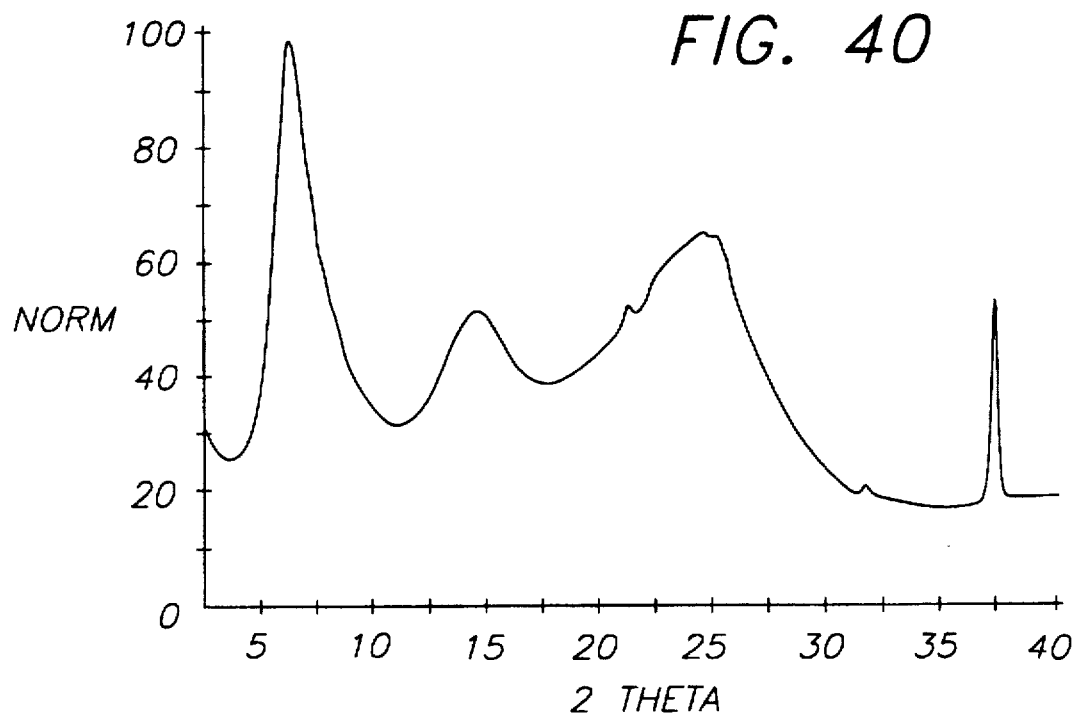
FIG. 40: Example 29.
Figure 41:
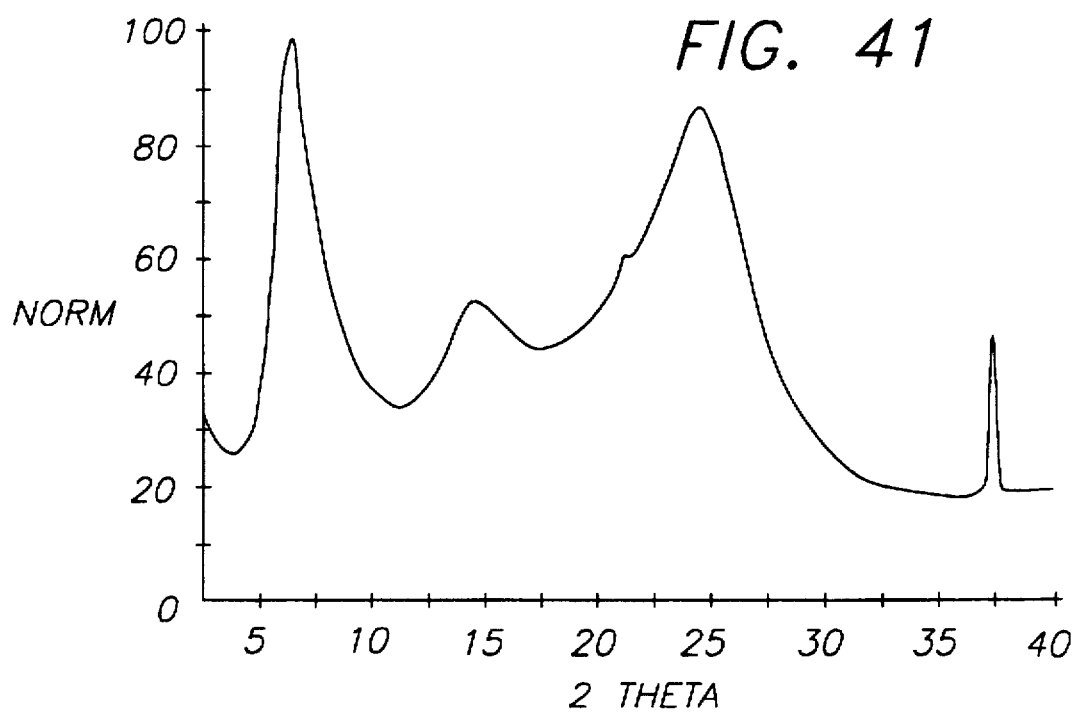
FIG. 41: Example 29.

The procedures of Example 13 were repeated except that the treating solvent was water. The x-ray diffraction spectra of the milled amorphous pigment mixture before the water treatment (FIG. 40) exhibited only three major peaks of the Bragg angle 2θ with respect to x-rays of Cu Kα at wavelength of 1.541 Å at 7.2°, 15.4°, and 25.5° (all ±0.2°). The x-ray diffraction spectra of the isolated amorphous pigment mixture after the water treatment (FIG. 41) also exhibited only three major peaks of the Bragg angle 2θ with respect to x-rays of Cu Kα at wavelength of 1.541 Å only at 7.2°, 15.4°, and 25.5° (all ±0.2°).

Example 30

An electrophotographic element was prepared and evaluated in substantially as in Comparative Examples 6–8, except that the pigment used was the product of Example 29; dichloromethane, (gamma$_{c=1.5}$) was used to prepare the charge generating layer dispersion. The electrophotographic element with a 1 micron charge generating layer exhibited $E^{50}$ speed of 1.2 ergs/cm$^2$, and dark decay of 6.1 V/s.

While specific embodiments of the invention have been shown and described herein for purposes of illustration, the protection afforded by any patent which may issue upon this application is not strictly limited to a disclosed embodiment; but rather extends to all modifications and arrangements which fall fairly within the scope of the claims.

What is claimed is:

1. A method for preparing an amorphous pigment mixture of titanyl phthalocyanine-titanyl fluorophthalocyanine composition of matter comprising the steps of:

admixing crude unsubstituted titanyl phthalocyanine and crude titanyl fluorophthalocyanine having the general structure:

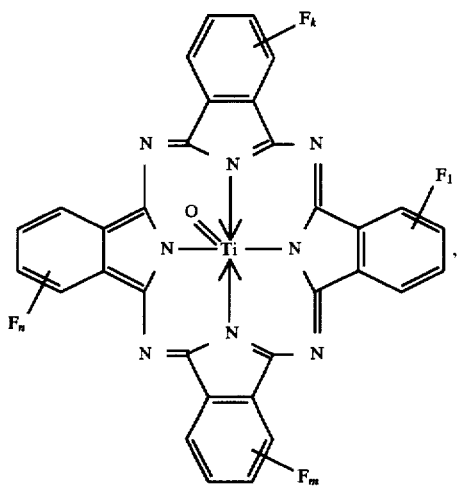

wherein each of k, l, m, and n is independently an integer from 0 to 4 and at least one of k, l, m, and n is an integer from 1 to 4;
to provide a pigment mixture;
milling said pigment mixture under shear conditions in the substantial absence of solvent and in the substantial absence of salt to form an amorphous pigment mixture;
said milling increases the amorphousness of said amorphous pigment mixture relative to said pigment mixture wherein said amorphous pigment mixture exhibits only three peaks of the Bragg angle 2θ with respect to x-rays of Cu Kα at a wavelength of 1.541 Å at 7.2°, 15.4°, and 25.5° (all ±0.2°);
following said milling, contacting said amorphous pigment mixture with a non-crystallizing solvent to form a slurry; and prior to said contacting step, substantially excluding said amorphous pigment mixture from contact with organic solvent having a gamma$_c$ hydrogen bonding parameter of greater than 9.0.

2. The method of claim 1 wherein said non-crystallizing solvent comprises water.

3. The method of claim 1, further comprising after said contacting step, the step of milling said slurry.

4. The method of claim 3, further comprising after said milling said slurry step, the step of removing said non-crystallizing solvent from said slurry to form an isolated amorphous pigment mixture.

5. The method of claim 4, wherein said isolated amorphous pigment mixture exhibits only three peaks of the Bragg angle 2θ with respect to x-rays of Cu Kα at a wavelength of 1.541 Å at 7.2°, 15.4°, and 25.5° (all ±0.2°).

6. The method of claim 4, further comprising the step of dispersing said isolated amorphous pigment mixture in a solvent to create a dispersion, said solvent having a gamma$_c$ hydrogen bonding parameter of less than 9.0, prior to any substantial contact with a solvent having a gamma$_c$ hydrogen bonding parameter of greater than 9.0.

7. The method of claim 6, wherein said dispersing step converts said isolated amorphous pigment mixture to a crystalline material having a first intensity peak at 7.4°±0.2° with respect to X-rays characteristic of Cu Kα at a wavelength of 1.541 Å of the Bragg angle 2θ and a second intensity peak at 28.6°±0.2°.

8. The method of claim 6, further comprising the step of coating said dispersion as a photogenerating layer in an electrophotographic element.

9. A composition of matter comprising a particulate mixture of:

substantially amorphous unsubstituted titanyl phthalocyanine and substantially amorphous titanyl fluorophthalocyanine having the general structure:

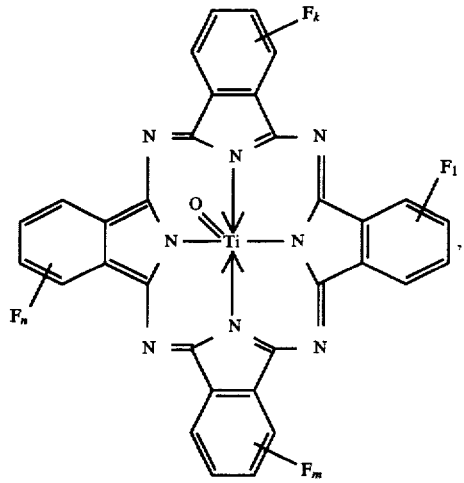

where each of k, l, m, and n is independently an integer from 0 to 4 and at least one of k, l, m, and n is an integer from 1 to 4;

said composition of matter exhibiting only three peaks of the Bragg angle 2θ with respect to x-rays of Cu Kα at a wavelength of 1.541 Å at 7.2°, 15.4°, and 25.5° (all ±0.2°).

* * * * *